US005835623A

United States Patent [19]
Nishijima et al.

[11] Patent Number: 5,835,623
[45] Date of Patent: Nov. 10, 1998

[54] METHOD OF AND APPARATUS FOR DISTINGUISHING ONE WORKPIECE FROM ANOTHER WORKPIECE AND DETECTING WORKPIECE POSITION

[75] Inventors: Takayoshi Nishijima; Kazuhiro Shinohara, both of Higashihiroshima; Yasuaki Yonezawa, Hatsukaichi; Tomoyuki Nozaki, Hiroshima; Hiroo Arataki, Hiroshima-ken, all of Japan

[73] Assignee: Mazda Motor Corporation, Hiroshima, Japan

[21] Appl. No.: 931,937

[22] Filed: Sep. 17, 1997

Related U.S. Application Data

[63] Continuation of Ser. No. 294,474, Aug. 23, 1994, abandoned.

[30] Foreign Application Priority Data

Aug. 23, 1993 [JP] Japan .................................. 5-207880
Mar. 30, 1994 [JP] Japan .................................. 6-061472

[51] Int. Cl.⁶ ...................................................... G06K 9/00
[52] U.S. Cl. ........................................... 382/152; 382/143
[58] Field of Search ..................................... 382/156, 203, 382/141, 172, 226, 291, 110, 168, 100, 101, 102, 142, 143, 144, 149, 152, 181, 190, 209, 312; 348/94, 89, 91, 142, 349, 125, 92; 395/94, 97; 209/556, 586, 587, 939; 358/448, 458

[56] References Cited

U.S. PATENT DOCUMENTS

| | | | |
|---|---|---|---|
| 4,687,107 | 8/1987 | Brown et al. ............................ | 348/91 |
| 4,693,378 | 9/1987 | Azegami et al. ........................ | 348/91 |
| 4,731,856 | 3/1988 | Lloyd et al. ............................. | 382/141 |
| 4,758,888 | 7/1988 | Lapidot .................................... | 348/91 |
| 4,963,035 | 10/1990 | McCarthy et al. ...................... | 348/91 |
| 4,984,075 | 1/1991 | Munaoka ................................ | 382/141 |
| 5,003,616 | 3/1991 | Orita et al. .............................. | 382/282 |
| 5,040,228 | 8/1991 | Bose et al. ............................... | 382/141 |
| 5,058,181 | 10/1991 | Ishihara et al. .......................... | 382/199 |
| 5,111,516 | 5/1992 | Nakano et al. .......................... | 382/203 |

FOREIGN PATENT DOCUMENTS

3-228591  10/1991  Japan ............................. B25J 13/00

*Primary Examiner*—Leo H. Boudreau
*Assistant Examiner*—Bijan Tadayon
*Attorney, Agent, or Firm*—Martin Fleit

[57] ABSTRACT

A method is used for discerning a specific type of a work, including a plurality of specified contoured portions forming parts of the work, from an image including the subject work. Each specified contoured portion, which may be defined by geometric characteristics, such as an area, a peripheral length of a specified contoured portion and a ratio between the area and peripheral length, is recognized in the image based on two-valued image data into which many-valued image data representative of the subject work is transformed with a threshold value. A position of the subject work is discerned based on a relative position of each two specified contoured portions defined by geometric characteristics, such as a distance between centers of each two specified contoured portions and an angle of a center line of each two specified contoured portions relative to a center line of another two specified contoured portions.

65 Claims, 20 Drawing Sheets

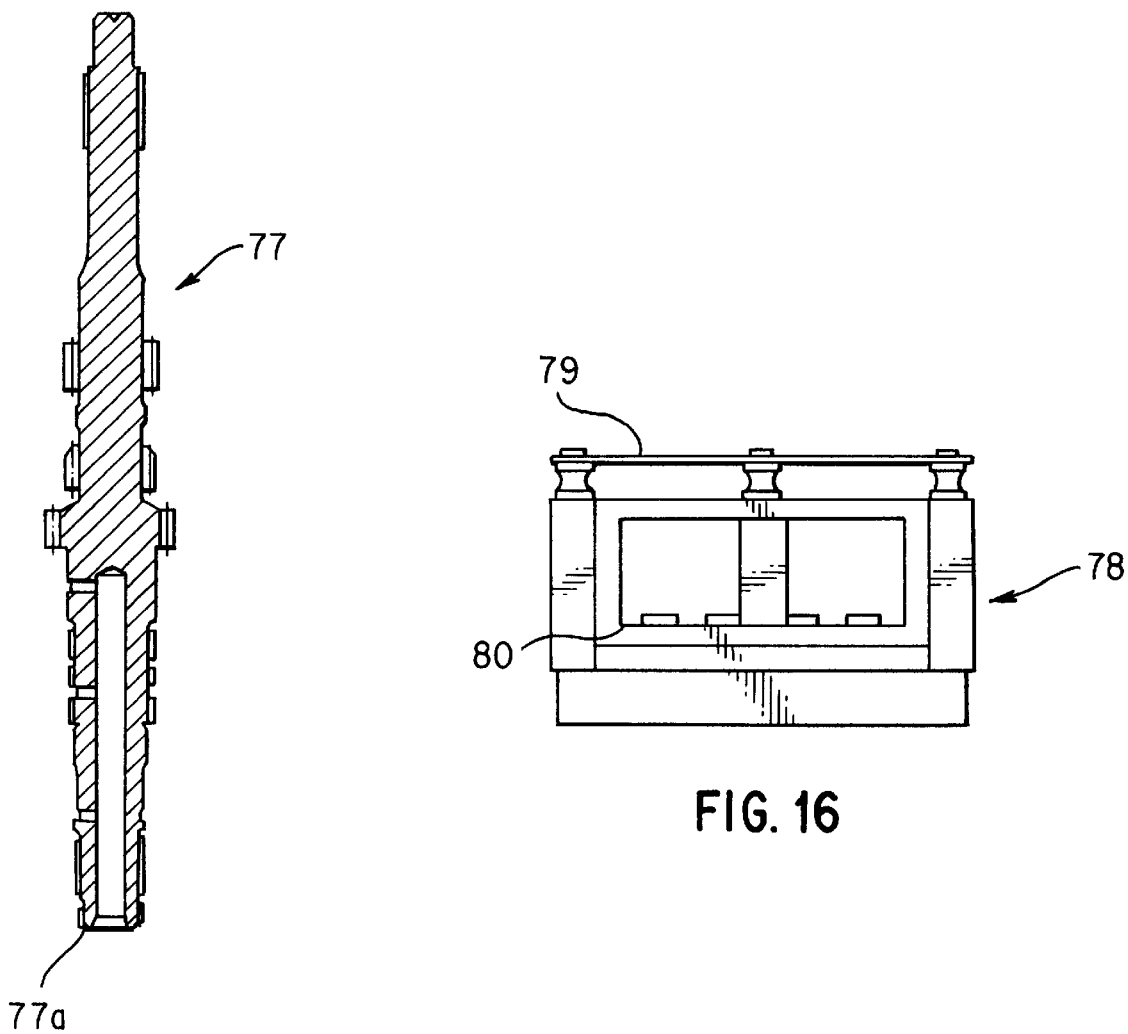
FIG. 15
FIG. 16
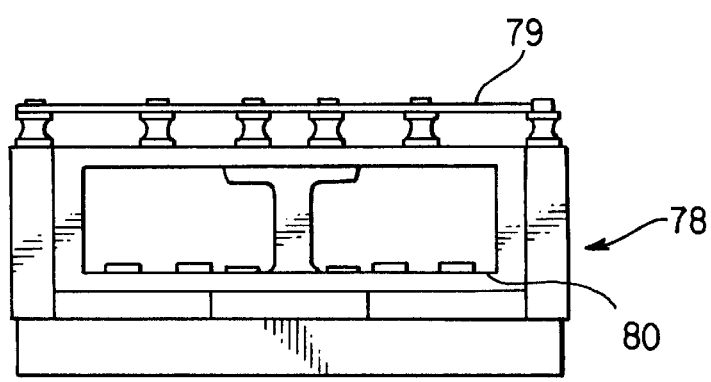
FIG. 17

METHOD OF AND APPARATUS FOR DISTINGUISHING ONE WORKPIECE FROM ANOTHER WORKPIECE AND DETECTING WORKPIECE POSITION

This application is a continuation of application Ser. No. 08/294,474, filed on Aug. 23, 1994, abandoned.

BACKGROUND OF THE INVENTION

1. Field of the Invention

The present invention relates to a method of discerning or distinguishing a subject workpiece or work from another workpiece or work, and detecting a position of the subject workpiece or work. The present invention also relates to an apparatus used to perform or practice this method.

2. Description of Related Art

Typically, in automated lines for assembling and/or manufacturing mechanical products such as vehicles, work handling manipulators or robots are widely used in order to automatically load, for instance, conveyor belts of an assembling line with blanks or finished components, such as cylinder blocks, cylinder heads, shafts, transmission cases, etc., as works. Such a work handling manipulator or robot picks up one work after another. The works are placed on a pallet positioned at a specified station and transported to a loading station at which the works are transferred onto the conveyor belt.

Generally, because works are not always placed in a fixed position or attitude on the pallet, it is necessary to detect or recognize a position of each work on the pallet in order to locate the work handling manipulator or robot in a position at which the work is. The detection or recognition of work position is done by, for instance, image processing and image analyzing. Such a manner of work position detection is known from, for instance, Japanese Unexamined Patent Publication No. 3-228591.

In the work position detection operation described in this Japanese publication, a subject work is picked up as an image of many-valued video data by a camera and is transformed into two-valued data of picture elements with a threshold value. Based on a specific pattern of two-valued picture elements, a position of the subject work is detected.

However, if an image includes a plurality of works, it is difficult to find two-valued picture elements associated only with the subject work, resulting in an unsuccessful detection of a position of the subject work. In addition, when an unsuccessful detection of a position of the subject work occurs, there is no remedy for the detection of work position.

SUMMARY OF THE INVENTION

It is an object of the present invention to provide a method of discerning a subject work from another work and successfully detecting a position of the subject work by an image analysis based on two-valued image data representative of the subject work.

It is another object of the present invention is to provide an apparatus for discerning a specific type of a subject work from another work of the same type and controlling a handling device for holding the subject work in order to transport the subject work to a predetermined remote position.

These objects of the present invention are achieved by providing a method of discerning a specific type of work including a plurality of specified contoured portions forming parts of the whole surface of the work from an image including the subject work. Each specified contoured portion in the image, which may be defined by geometric characteristics including at least an area of the specified contoured portion, a peripheral length of the specified contoured portion, and a ratio between the area and peripheral length, is recognized based on two-valued image data into which many-valued image data representative of the subject work is transformed with a threshold value. A position of the subject work is discerned based on a relative position of the two of the specified contoured portions which is defined by geometric characteristics including at least a distance between geometric centers of the two specified contoured portions and an angle of a straight line connecting the geometric centers of the two specified contoured portions relative to a straight line connecting geometric centers of another two specified contoured portions.

If the image includes a plurality of works of the same type, the relative position of the two specified contoured portions is compared with a predetermined reference position and, when the relative position is coincident with the predetermined reference position, the two specified contoured portions are identified as a part of the subject work and discerned from other works.

The threshold value is changed from an initially established threshold value when the relative position is not comparable with the reference position. Further, the initially established threshold value is changed when the relative position is not comparable with the reference position even after a predetermined number of changes of threshold value.

The apparatus for discerning a specific type of a subject work from another work of the same type, according to the present invention, has a camera for picking up an image of a predetermined area, including at least the subject work, and providing many-valued image data representative of the image, which is transformed into two-valued image data, using a threshold value, based on which each specified contoured portion in the image is recognized. The camera is changeable in focal length so as to widen the field of view after a predetermined number of changes of threshold value.

According to such a method of discerning a subject work from another work and detecting a position of the subject work, since the position of the subject work is recognized based on relative positions of a plurality of specified contoured portions of the subject work, the detection of work position is made with high accuracy. Specifically, the relative position is found based on a distance between geometric centers of the two specified contoured portions and an angle of a straight line connecting the geometric centers of the two specified contoured portions relative to a straight line connecting geometric centers of another two specified contoured portions. This provides an increase in the accuracy of detection of work position. Furthermore, since a subject work is discerned or distinguished from another work by comparing the relative position of each two specified contoured portions with a predetermined reference position and identifying the two specified contoured portions as a part of the subject work when the relative position is coincident with the predetermined reference position, detection of the position of a subject work is accurately made even when the image includes a plurality of works other than the subject work. In addition, changing of the threshold value provides two-valued image data suitable for the recognition of a specified contoured portion, resulting in an increased accuracy in detection of work position.

The method of the present invention enables work handling apparatuses, such as automated working robots, to handle works with a high accuracy.

BRIEF DESCRIPTION OF THE DRAWINGS

The above and other objects and features of the present invention will be clearly understood from the following description of a preferred embodiment thereof when considered in conjunction with the accompanying drawings, in which:

FIG. 15 is a vertical-sectional view of a primary shaft;

FIG. 16 is a side view of a primary shaft supporting case;

FIG. 17 is a front view of the primary shaft supporting case of FIG. 16;

DETAILED DESCRIPTION OF THE PREFERRED EMBODIMENT

Figure 1:
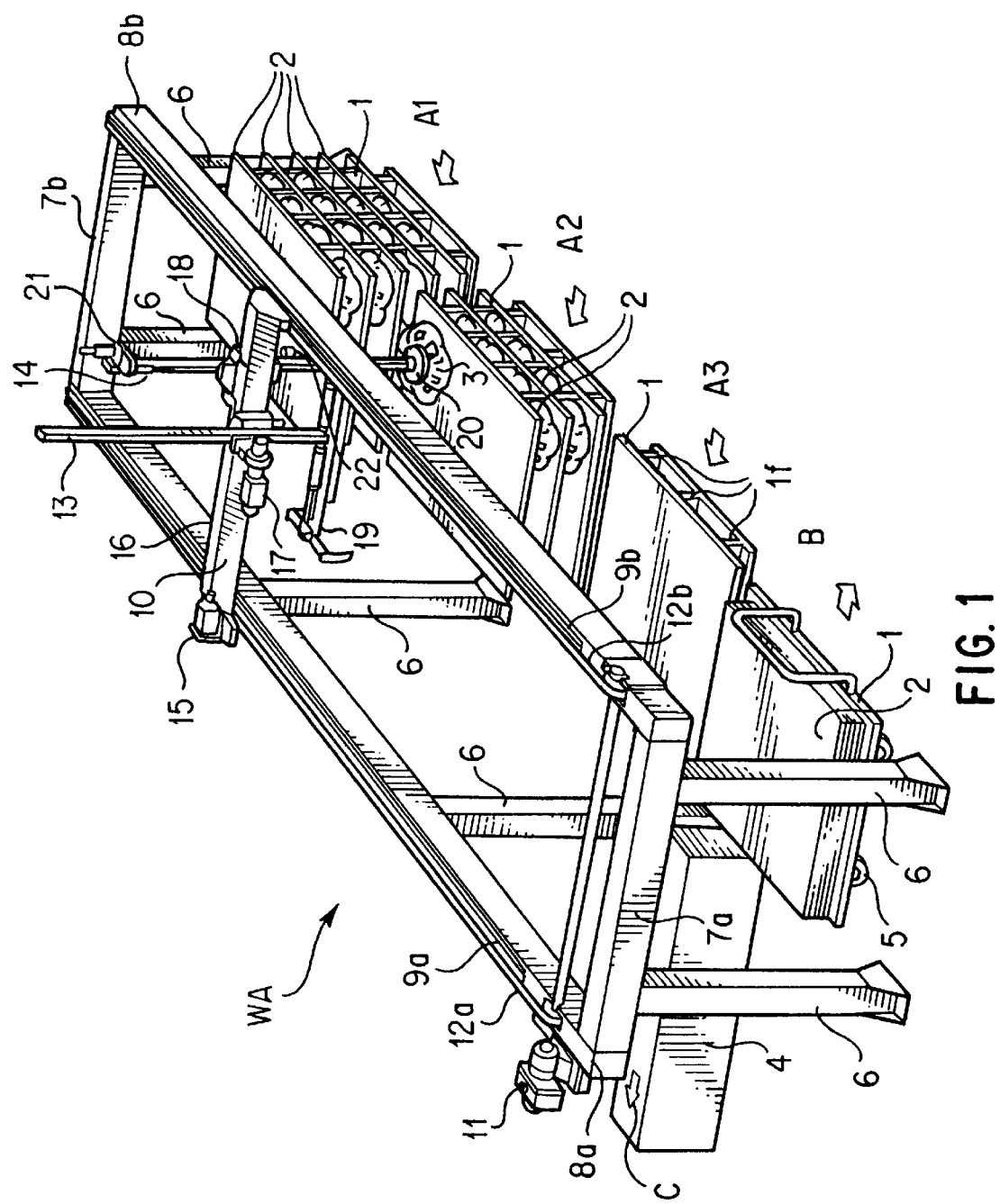
FIG. 1 is a perspective view of a work transportation apparatus to which the method of the present invention is applied.
Figure 2:
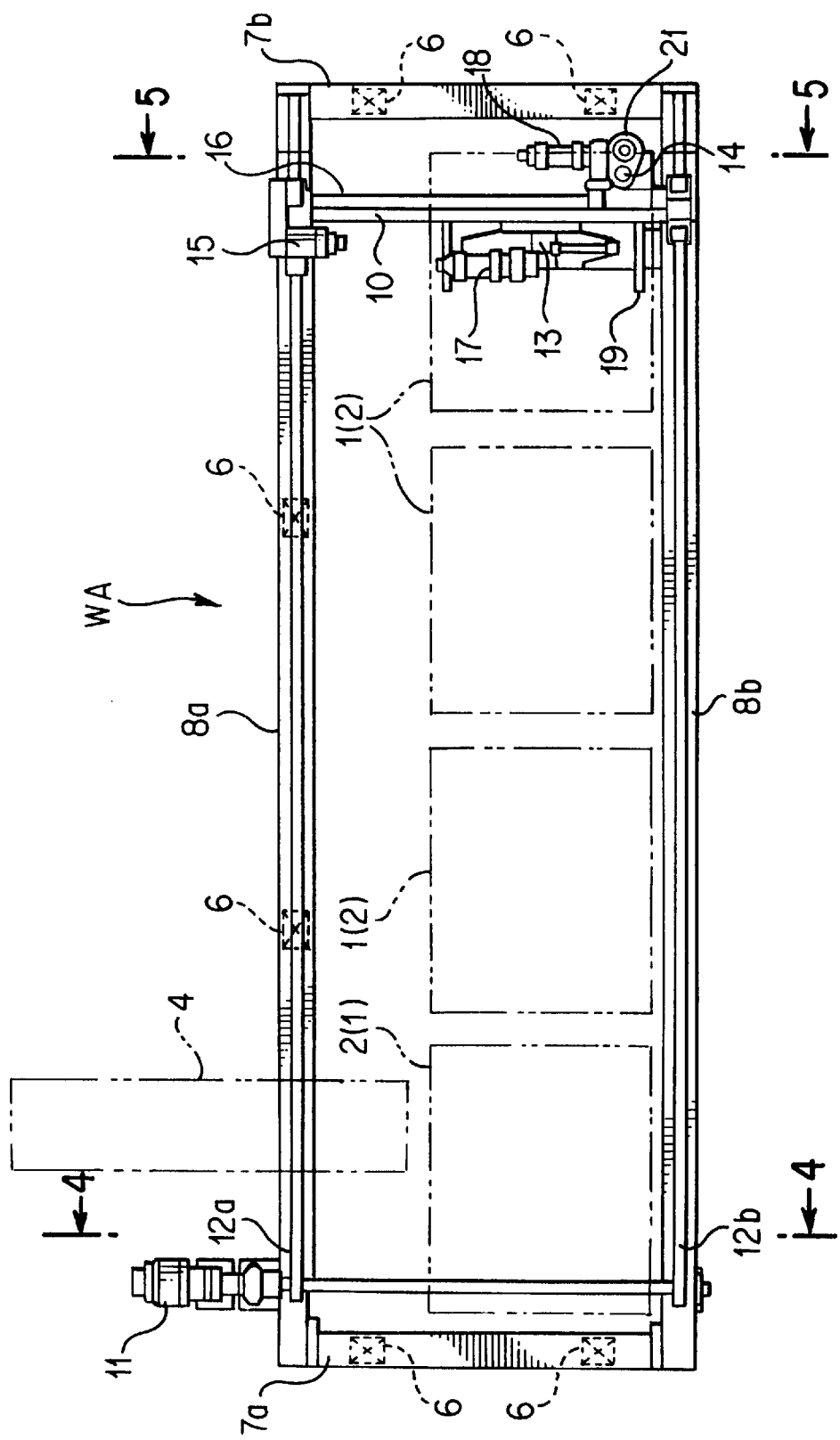
FIG. 2 is a schematic plan view of the work transportation apparatus of FIG. 1.
Figure 3:
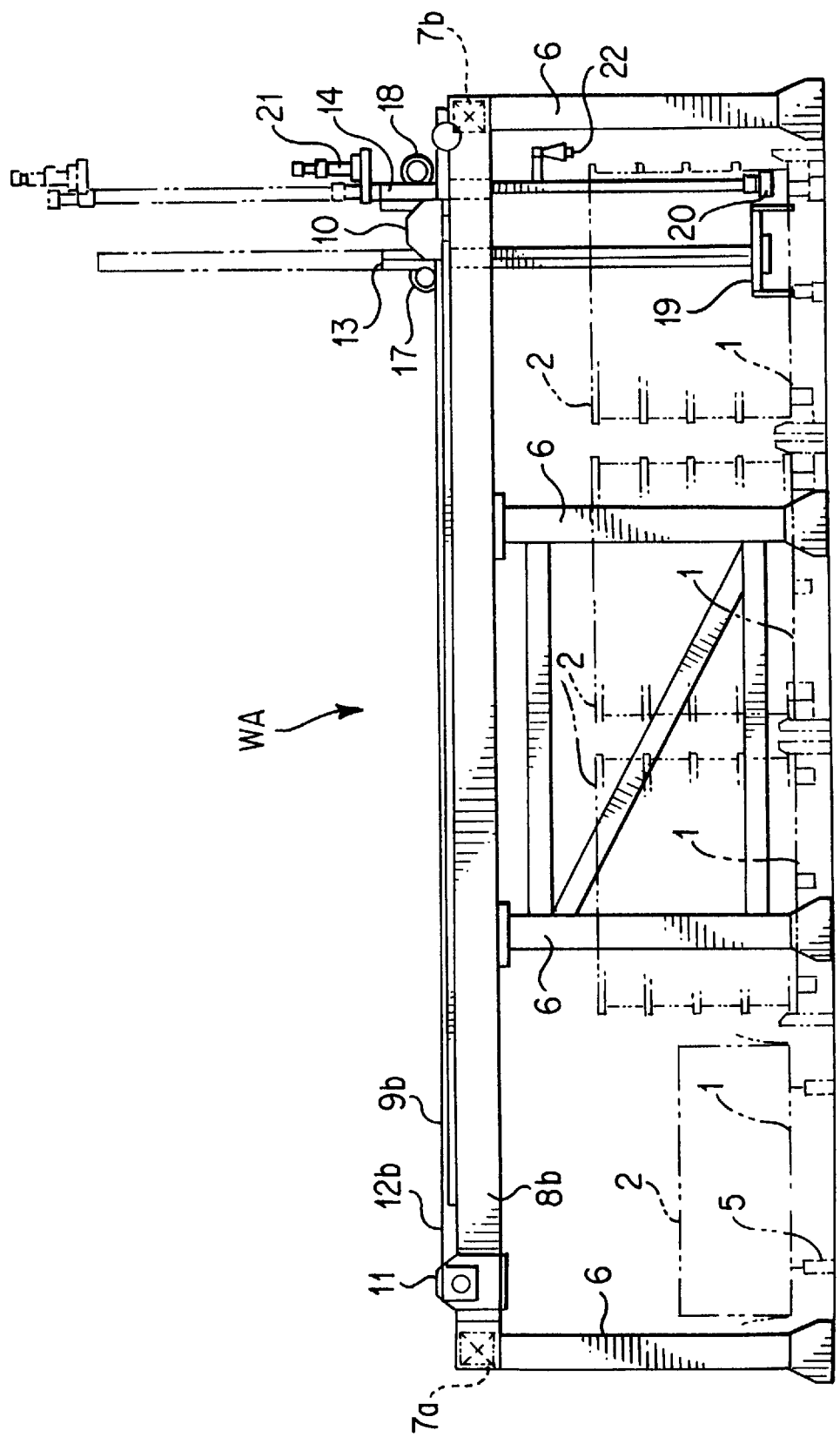
FIG. 3 is a schematic side view of the work transportation apparatus of FIG. 1.
Figure 5:
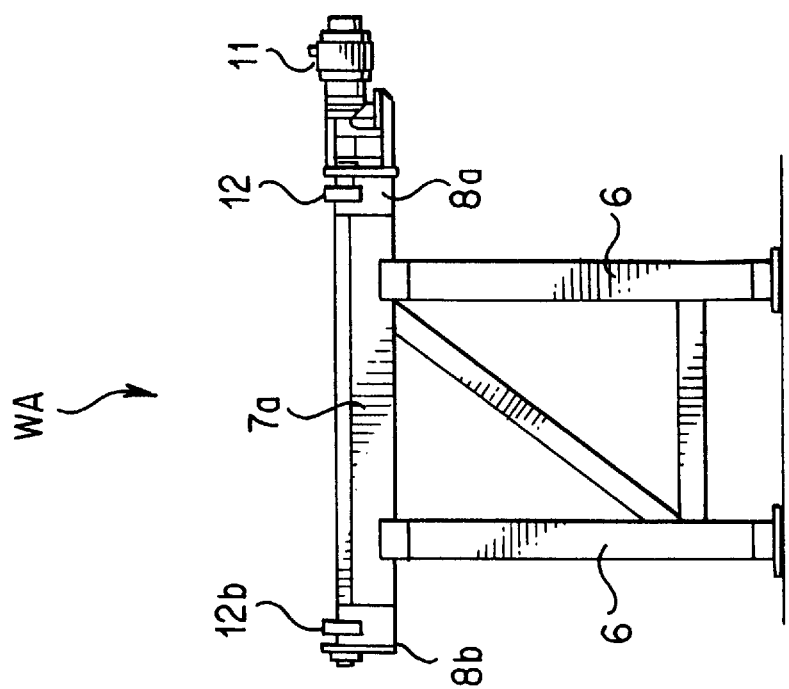
FIG. 5 is a vertical-sectional view of the work transportation apparatus as seen along a line Y—Y in FIG. 2.
Figure 4:
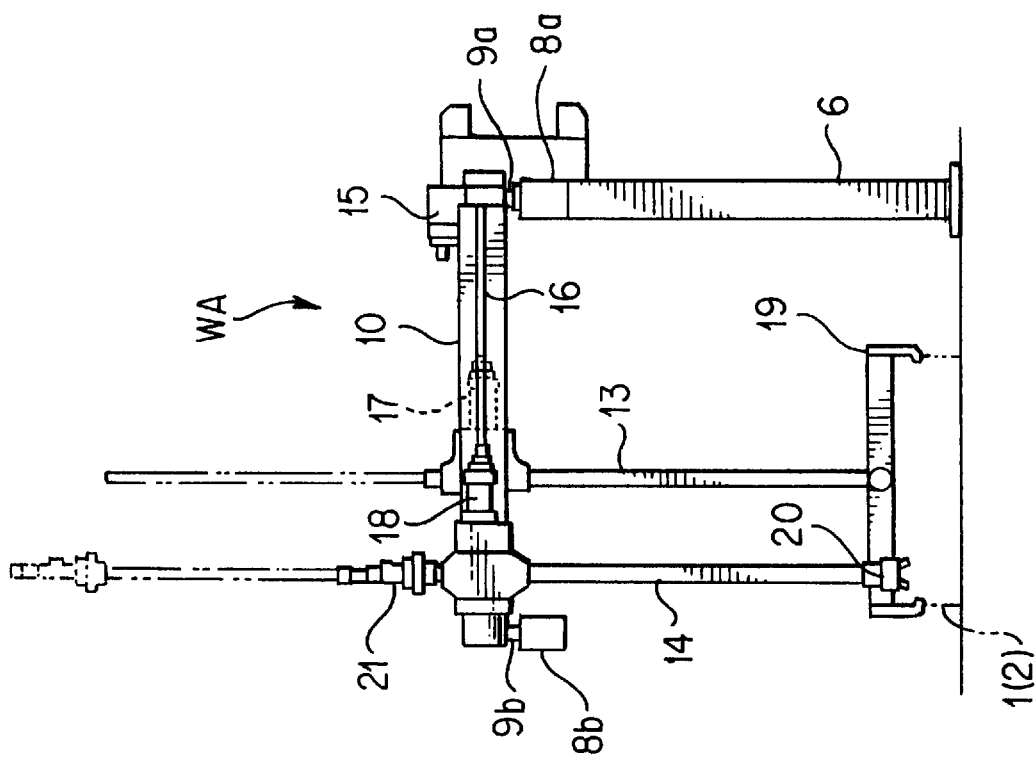
FIG. 4 is a vertical-sectional view of the work transportation apparatus as seen along a line X—X in FIG. 2.

Referring now to the drawings in detail and, in particular, to FIGS. 1 to 5, it will be seen that a transport station in an assembling line of a product such as, for instance, a transmission assembling line, includes a work store including a plurality of, for instance three, stacks A1–A3 of pallets. Each stack of pallets includes a base pallet 1 and a plurality of pallets 2. The respective pallets 2 are piled loosely on top of a plurality of works 3 placed on another pallet 1 or 2. The stacks of pallets A1–A3 are transported by a lifting device (not shown) such as a forklift truck, carried in under a work transporting apparatus WA in a direction shown by arrows in FIG. 1 and placed in specified positions. The work transporting apparatus WA automatically transports articles or works 3 placed on the pallet 1 or 2 one after another and loads a conveyor belt 4 with them. Thereafter, the work transporting apparatus WA deposits empty pallets 1 and 2 on a hand truck 5, one after another, at an unloading position B. When the hand truck 5 is loaded with an empty base pallet 1 and a predetermined number of the empty pallets 2 on the base pallet 1, it is removed from the unloading station or release position (RLS) B, as indicated by an arrow, and subsequently replaced with another empty hand truck 5. In this instance, the base pallet 1, which is of a double-decked type, has stringers 1f so as to form fork entries. On the other hand, the pallet 2 is of a single-decked type.

The work handling apparatus WA has a generally rectangularly shaped frame 3 including a pair of longitudinal side beams 8a and 8b disposed in parallel with each other and first and second or front and rear cross beams 7a and 7b extending transversely between and connecting the side beams 8a and 8b to each other. This frame 3 is supported by a plurality of legs 6 extending downward from one of the side beams, namely the side beam 8a, and the front and rear cross beams 7a and 7b. The side beams 8a and 8b are provided with guide rails 9a and 9b, respectively, secured to the upside thereof. A movable gantry 10 extends transversely across the side beams 8a and 8b and is guided on the guide rails 9a and 9b for slide movement in a lengthwise direction of the frame 3 between the front and the back. A drive motor 11 secured to the outer side of the side beam 8a and a pair of drive chains 12a and 12b connected to opposite ends of the movable gantry 10, which forms a gantry drive mechanism, drive the gantry 10 back and forth in the lengthwise direction on the guide rails 9a and 9b.

Figure 6:
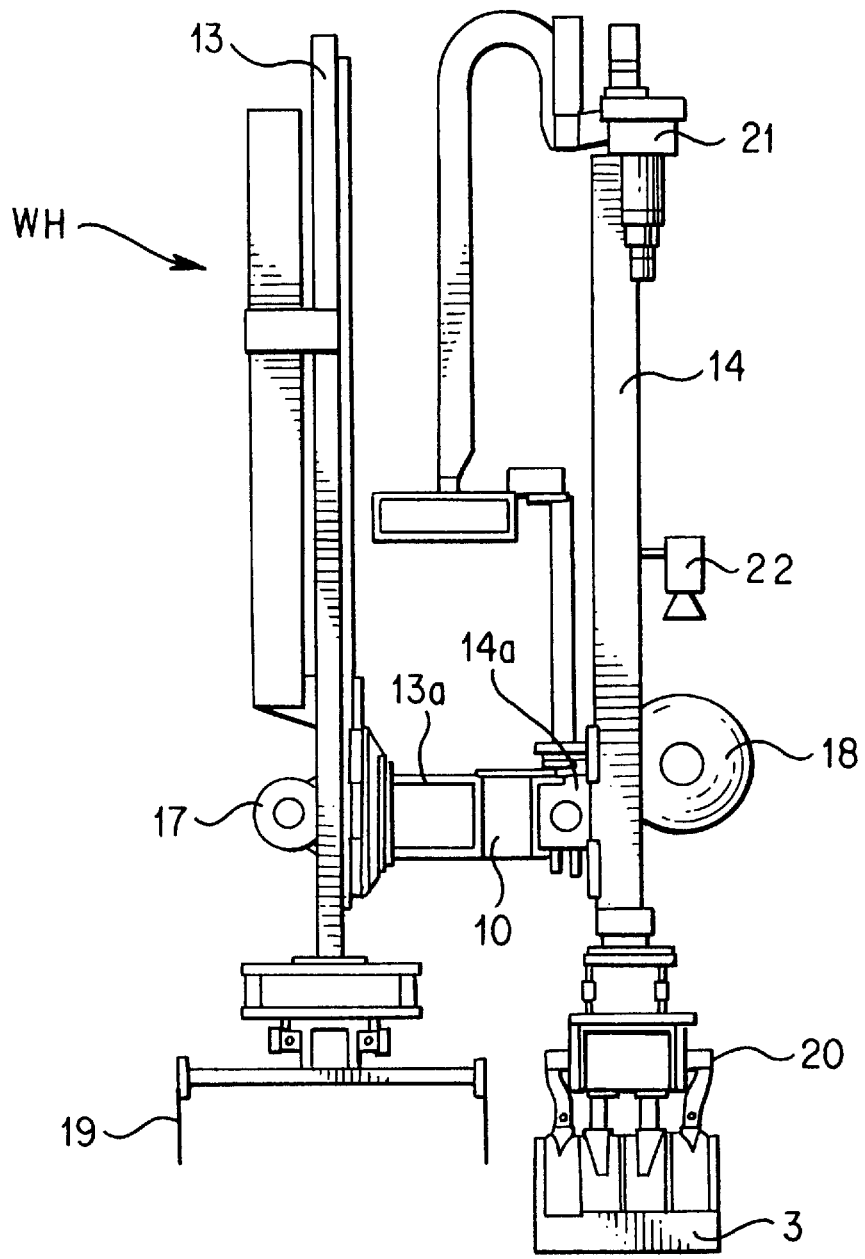
FIG. 6 is a side view of a robot hand unit including a work hand and pallet hand.

Referring to FIG. 6 in conjunction with FIG. 1, the works 3, for instance transmission cases in this embodiment, are individually picked up from the pallets 1 and 2 by a work handling device WH, and deposited on the conveyor belt 4. The work handling device WH is supported for vertical movement by the gantry 10. Specifically, the work handling device WH includes a pallet hand 19 and a work hand 20. The pallet hand 19 is connected to the lower end of an arm 13 which vertically extends and is held by a guide holder 13a secured to the front side of the gantry 10 so as to be moved up and down by an arm drive motor 17. The work hand 20 is connected to the lower end of a vertical arm 14 and supported for up and down sliding movement and turned about a vertical center line of the vertical arm 14 by a guide holder 14a mounted for sliding movement on the rear side of the gantry 10. The gantry 10 is provided with the drive motor 15, which is operationally coupled to the guide holder 14a by means of a drive chain 16, so as to cause transverse sliding movement of the guide holder 14a on the gantry 10 and an arm drive motor 18 for causing vertical sliding movement of the arm 14 on the guide holder 14a. The arm 14 for the work hand 20 is provided at its top end with an arm drive motor 21 for causing turning of the arm 14 about the vertical center line and at the middle with a video camera 22 for monitoring the pallet 1 or 2 with the works 3 placed thereon.

Figure 7:
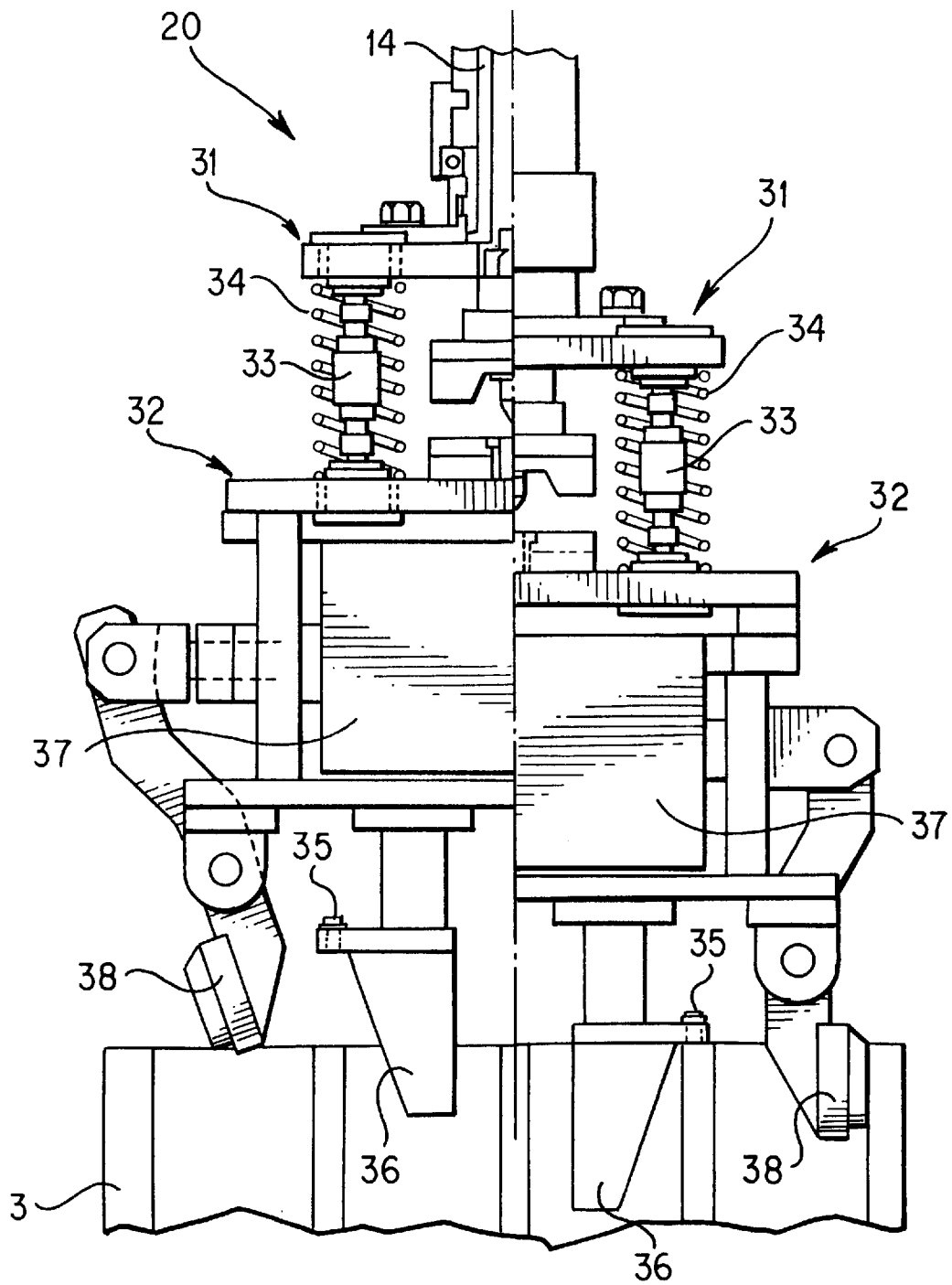
FIG. 7 is an explanatory view of the work hand as viewed from the front.
Figures 8A, 8B:
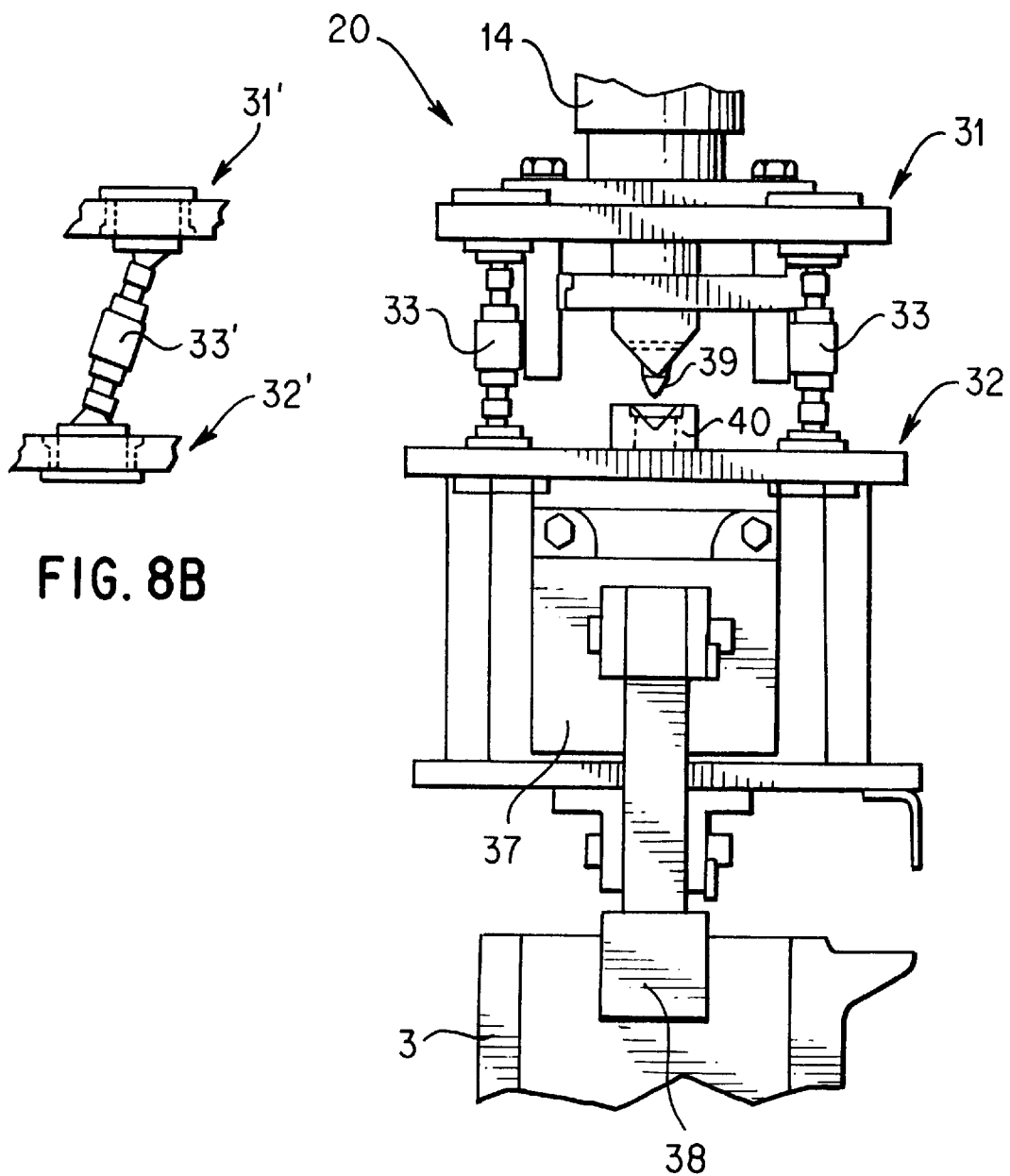
FIGS. 8A and 8B are explanatory views of the work hand as viewed from the side.

Referring to FIGS. 7, 8A and 8B, in which a cylinder block is depicted as a work 3, showing details of the work hand 20, a hand unit 32 is connected to the lower end of the arm 14 by means of a universal joint unit 31 so as to be displaced perpendicularly with respect to the arm 14. As will be described in detail later, the universal joint unit 31 includes a pair of ball joints 33 and coil springs 34. The hand unit 32 has a pair of position stabilizing fingers 36 provided with contact switches 35 and a pair of holding fingers 38. The holding fingers 38 are driven by a pneumatic cylinder 37 so as to be brought into engagement with specified parts of the work 3, such as cylinder bores of a cylinder block, and disengaged from the work 3, thereby holding and releasing the work 3. The position stabilizing fingers 36 stabilize the work 3 in position on the pallet 1 or 2 while the holding fingers 38 try to hold it.

Figure 9:
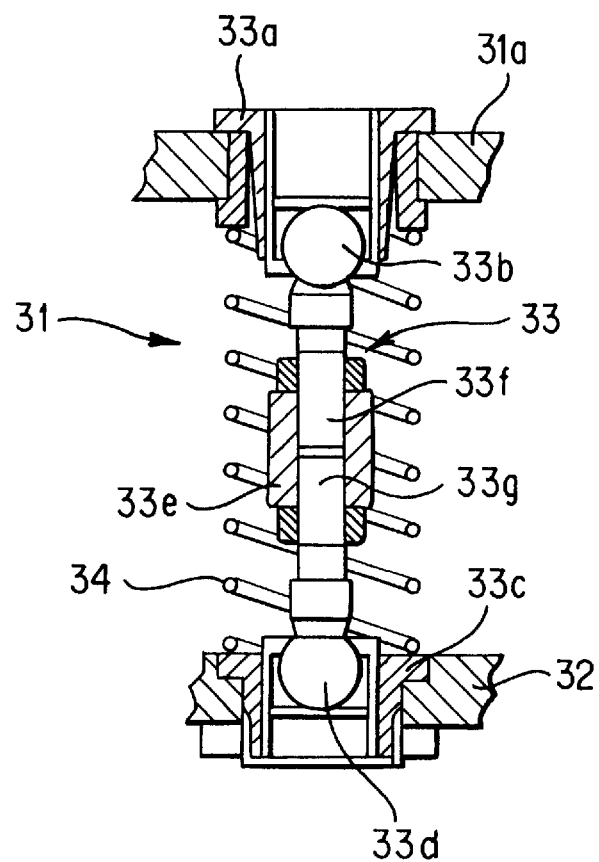
FIG. 9 is an explanatory view of a universal joint unit of the work hand as viewed from the front.

As shown in FIG. 9, the ball joint 33 includes a first and second link balls 33b and 33d and a liner shaft coupling means comprising first and second liner rods 33f and 33g. The first link ball 33b, to which the first liner rod 33f is secured, is received within a first socket 33a secured to an attachment plate 31a through which the work hand 20 is connected to the lower end of the arm 14. Similarly, the second link ball 33b, to which the second liner rod 33g is secured, is received within a second socket 33c secured to an attachment plate 32a through which the hand unit 32 is connected to the universal joint unit 31. These first and second liner rods 33f and 33g are received for sliding movement within a cylindrical tube 33e. The universal joint unit 31, thus structured, provides a relative horizontal displacement between the attachments 31a and 32a as shown in FIG. 8B and, hence, between the hand unit 32 and the arm 14. Accordingly, it is ensured that the hand unit 32 will hold the work 3 even if it is not in position with respect to the arm 14. The universal joint unit 31 is further provided with a steady rest mechanism 40, which mechanically couples the universal joint unit 31 and the hand unit 32 together so as to prevent any relative horizontal displacement between the universal joint unit 31 and the hand unit 32 while the work hand 20 holds the work 3 and transports it. The steady rest mechanism 40 comprises a retractable rest pin 40a held by the attachment 31a of the universal joint unit 31 and a receptacle 40b secured to the attachment 32a of the hand unit 32. When the rest pin 40a is brought into engagement with the receptacle 40b, the universal joint unit 31 and the hand unit 32 are mechanically coupled together.

Figure 10:
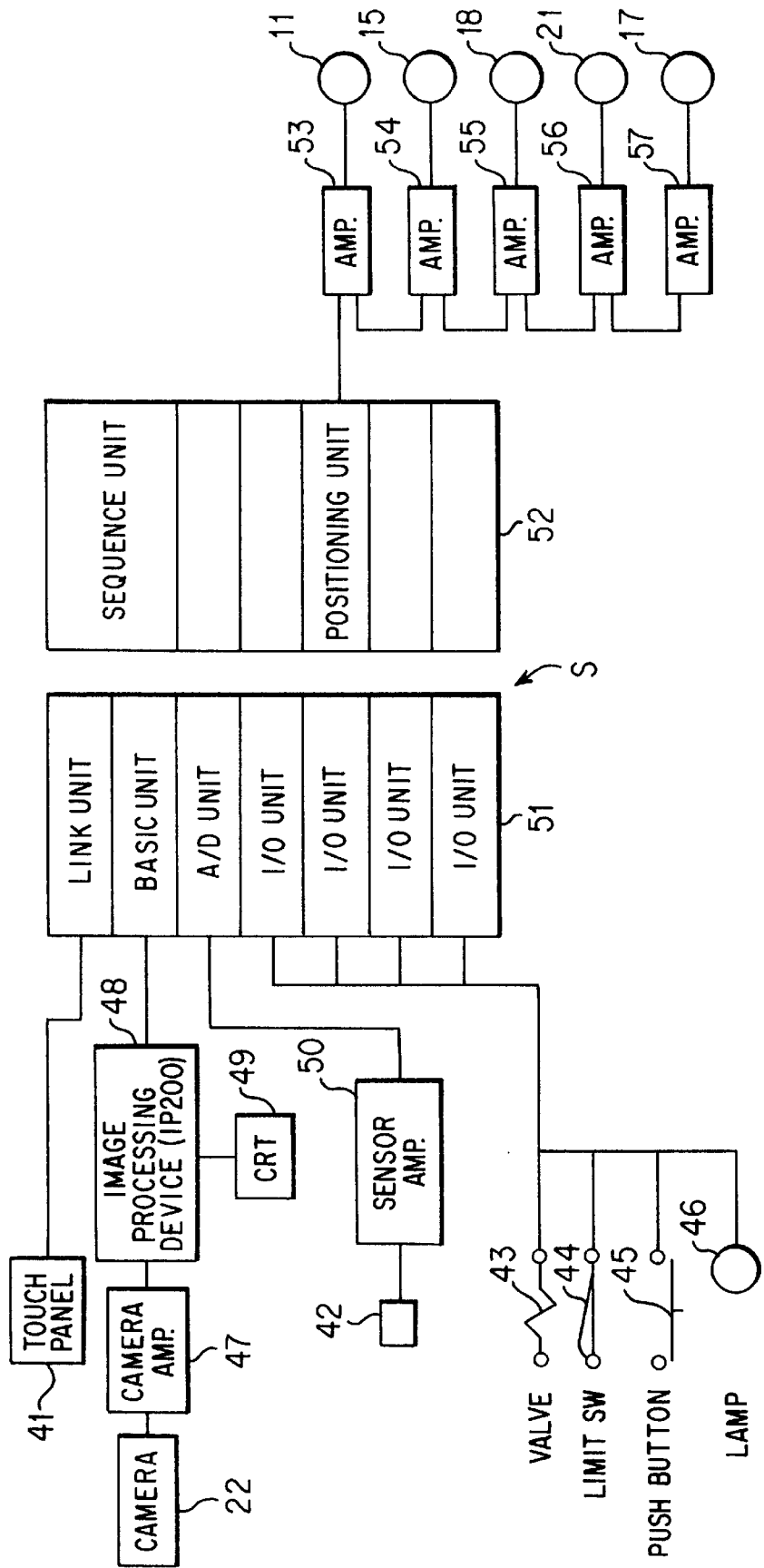
FIG. 10 is a block diagram of a control system for the work transportation apparatus of FIG. 1.

Referring to FIG. 10, illustrating a control system S for controlling the operation of the work handling device WH, the control system S, which is composed mainly by a microcomputer, includes first and second controllers or controller units 51 and 52. The first controller unit 51 has a dominant link unit, a basic subunit, an A/D converter unit and a plurality of I/O units. This dominant link unit links the first and second controllers 51 and 52 so as to govern intercommunication between them. This dominant link unit receives signals from a touch panel 41 entered by an operator. The basic unit receives video data representative of an image picked up by the video camera 22, amplified by an amplifier 47, and processed by an image processing device 48. As will be described later, the image processing device 48 transforms an image of the work 3 picked up by the video camera 22 to two-valued data from many-valued data with a specified threshold limit value for the purpose of finding specified contoured portions of the work 3 and a position of the work 3 from the two-valued data of the image. The data representative of work position is displayed on a CRT display device 49. The A/D converter unit receives a signal from a sensor 42 through a sensor amplifier 50. This signal represents the distance between the pallet hand 19 and the uppermost pallet 2 of the stack A1–A3 right below the pallet hand 19 or, desirably, the distance between the work hand 20 and the work 3 placed on the uppermost pallet 2 of the stack A1–A3 right below the work hand 20. Connected to the I/O units are a valve 43, a limit switch 44, a push button 45 and a lamp 46, respectively.

The second controller 52 has a sequence control unit for sequential control of the various drive mechanisms, such as the gantry drive motor 11, the guide holder drive motor 15, the arm drive motors 17, 18 and 21, and robot hand drive means (not shown) for the hands 19 and 20. The second controller 52 further has a position control unit for driving and controlling the motors 11, 15, 17, 18 and 21 through first to fifth amplifiers 53–57, respectively, so as to move the hands 19 and 20 in any desired position.

Figure 11:
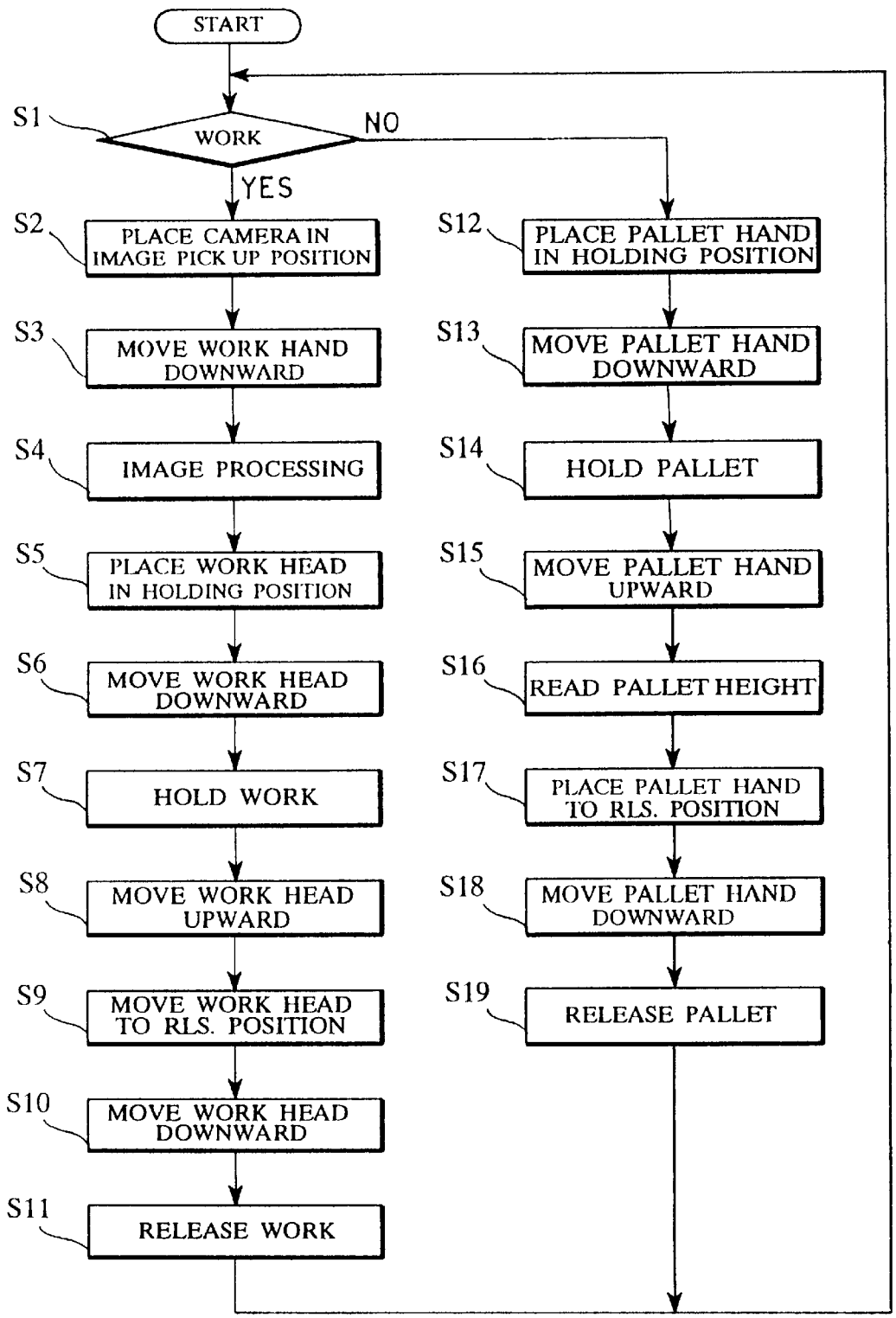
FIG. 11 is a flow chart illustrating a work transportation control main routine for a microcomputer of the control system.
Figure 12:
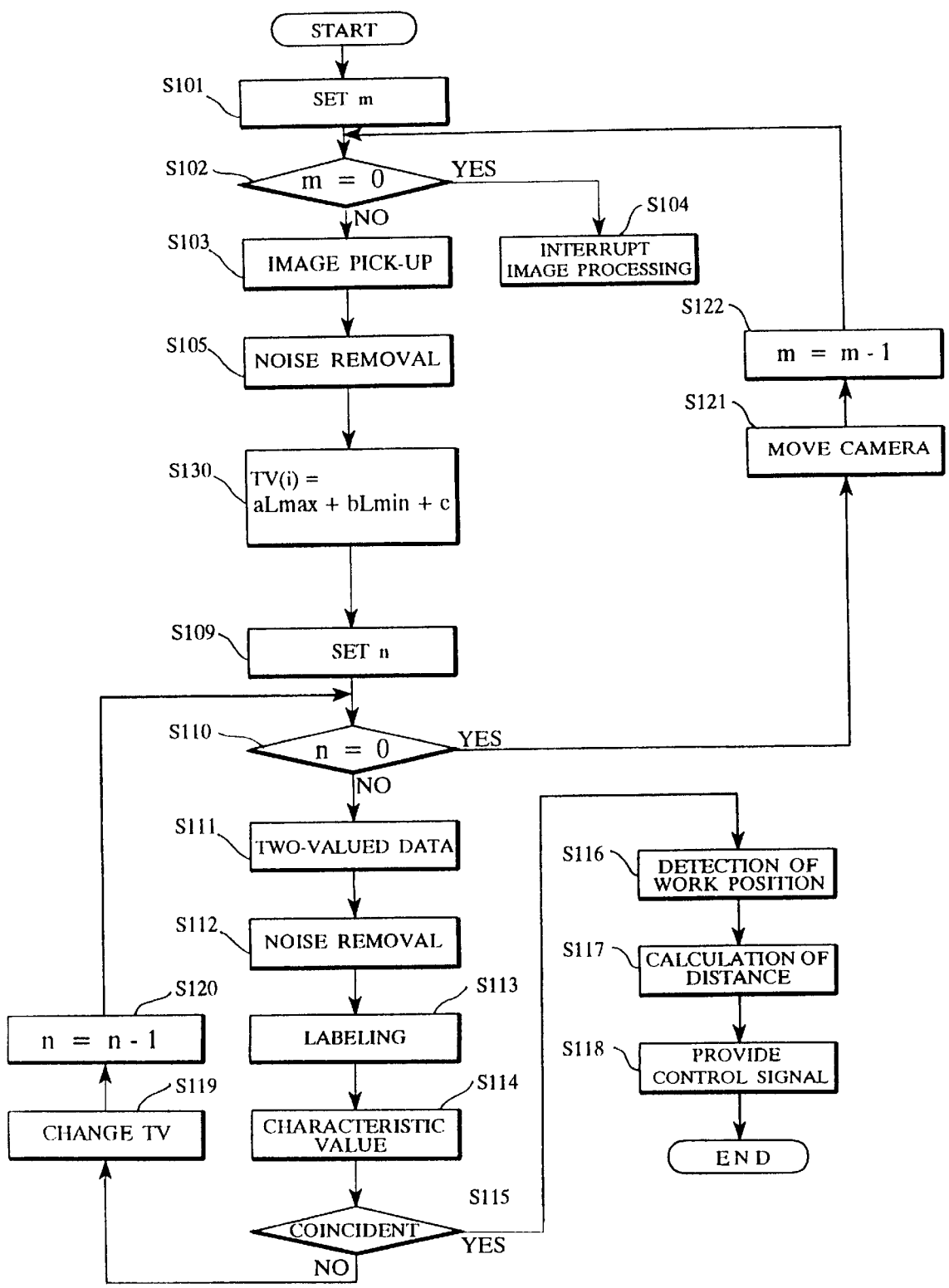
FIG. 12 is a flow chart illustrating an image processing and work position detecting subroutine for a microcomputer of the control system, which is applied to works such as engine cylinder blocks.

The operation of the work handling apparatus WA depicted in FIGS. 1 through 10 is best understood by reviewing FIGS. 11 and 12, which are flow charts illustrating control routines, respectively, for the microcomputer of the control system S. Programming a computer is a skill well understood in the art. The following description is written to enable a programmer having ordinary skill in the art to prepare an appropriate program for the microcomputer. The particular details of any such program would, of course, depend upon the architecture of the particular computer selected. The following description is directed to transporting cylinder blocks as the works 3 such as shown in FIGS. 14A and 14B.

Figure 14A:
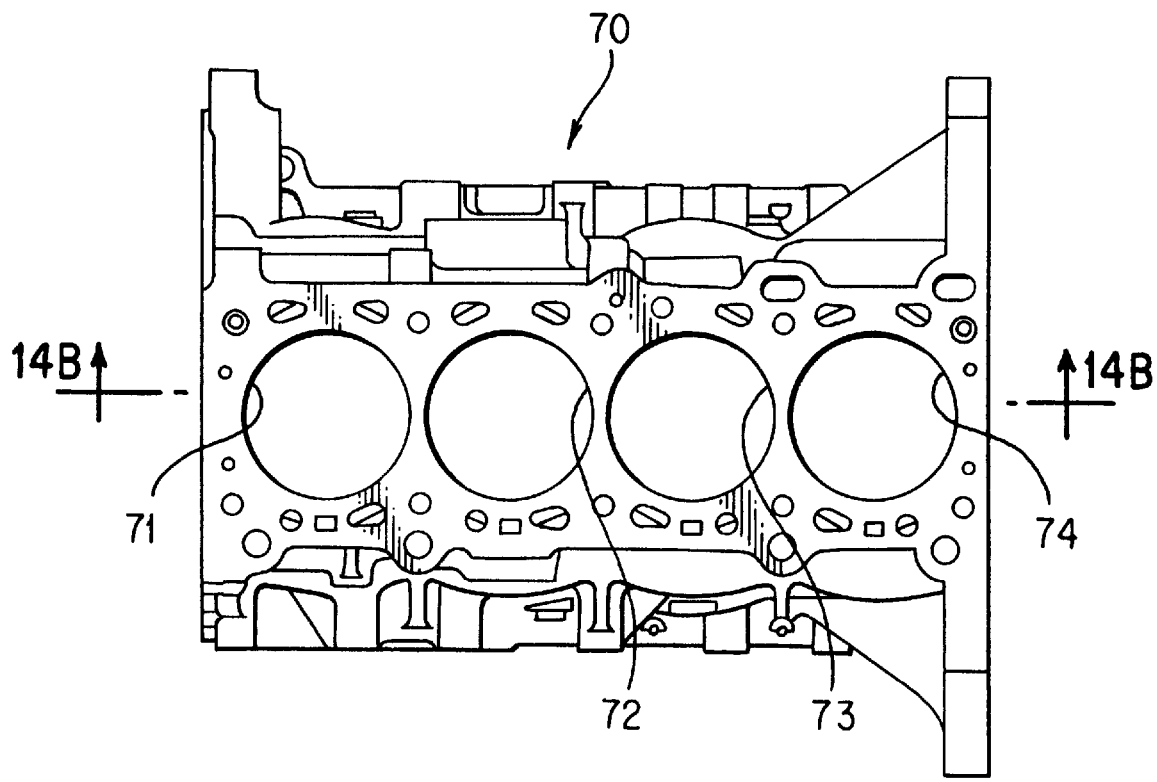
FIG. 14A is an explanatory view of a cylinder block as viewed from the top.
Figure 14B:
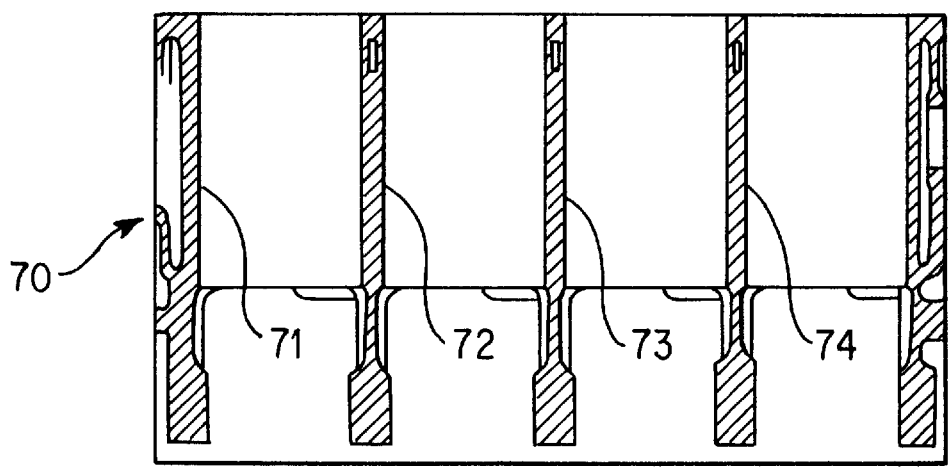
FIG. 14B is a sectional view of the cylinder block of FIG. 14A.

As shown in FIGS. 14A and 14B, a cylinder block 70 of an in-line four cylinder engine, which is the work to be handled by the work handling apparatus WA, has four cylinder bores 71–74 arranged in a straight line or row in the lengthwise direction. The position detection or recognition of the cylinder block 70 is performed based on an image of the top surface of the cylinder block 70.

Referring to FIG. 11, showing a flow chart of the transportation control main routine, the flow chart logic commences and control passes directly to a decision block S1 where a decision is made as to whether the object to be transported is a cylinder block 70 as a work 3 or a pallet 1 or 2. This decision is made based on an image picked up by the camera 22. If the answer to the decision is "YES," then, at step S2, the gantry drive motor 11 and the guide holder drive motor 15 are driven to shift the gantry 10 by a specified distance in the lengthwise direction of the frame 3 and the guide holder 14a transversely by a specified distance so as to place the camera 22 in the image pick-up position where the camera 22 positions the center of the field of view approximately coincident with the center of the top surface of the cylinder block 70. At step S3, the arm drive motor 18 is subsequently driven to lower the arm 14 of the work hand 20 by a specified distance so as to locate the camera 22 in a vertical position suitable for picking up an image of the top surface of the cylinder block 70. Then, at step S4, image processing and work position detection take place in order to find a position of the cylinder block 70. A calculation is made on the basis of the position of the cylinder block 70 so as to find distances and an angle necessary for the work hand 20 to be shifted and turned. These shift distances and angle are defined by the amounts of rotation of the motors 11, 15 and 21. The image processing and work position detection will be described in detail later in conjunction with FIG. 12.

Thereafter, at step S5, the motors 11, 15 and 21 are driven according to signals indicating the amounts of rotation obtained at step S4 so as to place the work hand 20 in the position where the work hand 20 is ensured to hold the cylinder head 70. Subsequently, after driving the motor 18 to move the work hand 20 vertically downward toward the cylinder head 70 at step S6, the pneumatic cylinder 37 is actuated to cause the holding fingers 38 of the work hand to hold the cylinder head 70 while the motor 18 is at rest at step S7. After reversing the motor 18 so as to move the work hand 20 upward at step S8, the motors 11, 15 and 21 are driven again to move the work hand 20 so as to locate the cylinder head 70 in the release (RLS) position B where the conveyor belt 4 is installed at step S9. While the work hand 20 stays in the release position B, the motor 18 is driven again to move the work hand 20 downward at step S10 and the pneumatic cylinder 37 is actuated to cause the holding fingers 38 to release and place the cylinder head 70 on the conveyor belt 4 at step S11. Thereafter, the motors 11, 15, 18 and 21 are reversed all together to bring back the work hand 20 to its original position. After the work hand 20 has returned to the original position, control returns to the decision block S1.

On the other hand, if the answer to the decision made at step S1 is "NO," this indicates that the object to be transported is the pallet 1 or 2 of the stack. Then, the motor 11 is driven to move the gantry 10 in the lengthwise direction of the frame 3 so as to place the pallet hand 19 in a holding position at step S12. The motor 17 is then driven to move the pallet hand 19 downward at step S13 so as to locate it right above the pallet 1 or 2 of the stack. After holding the pallet 1 or 2 with the pallet hand 19 at step S14, the motor 17 is reversed to move the pallet hand 19 upward at step S15 so as to lift the pallet 1 or 2 to a predetermined level. At step S16, the height of the stack of pallets 1 and 2 on the hand truck 5 in the releasing position B, which is calculated based on the number of pallets 1 and 2 still on the hand truck 5, and the vertical distance, by which the pallet hand 19 is moved down from the predetermined level based on the height of the stack of pallets 1 and 2, are read. Then, the motor 11 is driven to place the pallet hand 19 with the pallet 2 right above the stack of pallets 1 and 2 on the hand truck 5 in the releasing position B at step S17. The motor 17 is subsequently driven again to move the pallet hand 19 downward by the vertical distance from the predetermined level at step S18. Thereafter, the pallet hand 19 releases and places the pallet 2 on the top of the stack of pallets 1 and 2 on the hand truck 5 in the releasing position B at step S19. After the work or the pallet has been transported at step S11 or at step S19, control returns to the decision block at step S1.

Briefly stated, the image processing and work position detection, which takes place at step S4 of the transportation control main routine, includes transforming of an image of a cylinder block 70 from many-valued image data to two-valued image data with a specified threshold limit value and, if the two-valued image data provides an unsuccessful detection of the work position only, another transformation of the image data representative of the cylinder block 70 is made with a threshold limit value changed from the specified threshold limit value which has been initially established. In the event that successful detection of a work position does not take place even after the threshold limit value has been changed a predetermined number of times, the camera 22 is changed in horizontal position to zoom in on the cylinder block 70, so as thereby to provide other two-valued image data representative of the cylinder block 70. If a predetermined number of position changes of the camera 22 still provides an unsuccessful detection of work position only, control is broken off because something is considered to be wrong with the image processing device.

FIG. 12 is a flow chart of the details of the image processing and work position detection subroutine. The first step, taking place at step S101, is to set a predetermined initial count "m" of a counter at step S101. The counter changes the initial count "m" by a decrement of one (1) every time the position of the camera 22 is changed so that it approaches a position at which it can pick up an image of an cylinder block 70 to be transported at step S122. As was previously described, such a change in the position of the camera 22 is made when the detection of work position is still unsuccessful after a predetermined number of times of alterations in threshold limit value. When the counter has changed its count to zero (0), the control system S determines that the image processing is unable to be done at step S104.

After initially setting the count "m" of the counter at step S101, a decision is made at step S102 as to whether the count "m" of the counter has reached zero (0). If the answer to the decision is "YES," this indicates that the camera 22 has been shifted in position "m" times. Then the control system S determines that the image processing is unable to be done and brings the image processing to an interruption at step S104. On the other hand, if the answer to the decision is "NO," then, the camera 22 picks up a chiaroscuro image of the cylinder block 70 and provides image data representative of the chiaroscuro image at step S103. Noises are subsequently removed from the image data at step S105. A decision is made at step S106 as to whether a flag NG has been set ON. The flag NG is set ON when the detection of work position is still unsuccessful after the predetermined number of times of alterations of the threshold value. If the flag NG has not yet been set ON, the initial threshold value TV(i-1) which has been previously established is substituted for another initial threshold value TV(i) at step S107. The reason for the substitution of the previous threshold value TV(i-1) for the initial threshold value TV(i) is that the previous threshold value TV(i-1) leaves the detection of work position possible. However, if the flag NG has been set ON, this indicates that neither the initial threshold value TV(i) nor a miner change in threshold value can make it possible to detect the position of the cylinder block 70. Then, an average luminance Lavr is substituted for another initial threshold value TV(i) at step S108. It is noted that the average luminance is defined as an average of luminance of the entire area of the chiaroscuro image picked up by the camera 22. In this instance, the solid part of the top of the cylinder block 70 appears light on the chiaroscuro image, and a specific contour of portions, such as circular bore portions, of the top of cylinder block 70, are shaded or dark on the chiaroscuro image.

After setting the initial threshold value TV(i) at step S107 or step S108, a predetermined initial count "n" of a counter is set at step S109. In this instance, the counter changes the count "n" by a decrement of one (1) every time the threshold value TV, with which many-valued image data is transformed to two-valued data, is changed at step S120, and every "n" times of changes in threshold value TV the camera 22 is changed in position. Subsequently, at step S110, a decision is made as to whether the count "n" of the counter has reached zero (0). If the answer to the decision is "YES," then, after moving the camera 22 horizontally by a predetermined distance for position changing at step S121, the count "m" is changed by a decrement of one (1) at step S122, and the flag NG is subsequently set ON at step S123. Thereafter, control proceeds to the decision at step S102.

If the answer to the decision made at step S110 is "NO," the many-valued image data is transformed into two-valued image data at step S111, and noises are removed at step S112. For two-valued image data, a value of 1 is given to picture elements lighter than the initial threshold value TV(i) and a value of 0 is given to picture elements darker than the initial threshold value TV(i). The transformation to two-valued data may be done with respect to a specific wave length of light. Then, labeling is conducted at step S113. The labeling is performed such that a picture element having the value of 1 adjacent to another picture element having the value of 1 is labeled "A" and a group of adjacent picture elements labeled "A" is recognized as a complete portion having the specific contour, i.e. a circle, indicative of the cylinder bore 71–74 in this embodiment. It is desirable to select portions or parts of the cylinder block 70 having a simple contour for the specific contour portion which are recognizable as independent groups of dark, or otherwise light, picture elements. As a result of the transformation of image data to two-valued data and the labeling of picture elements, all of the circular portions of the image, i.e. the cylinder bores 71–74, are recognized.

Figure 23:
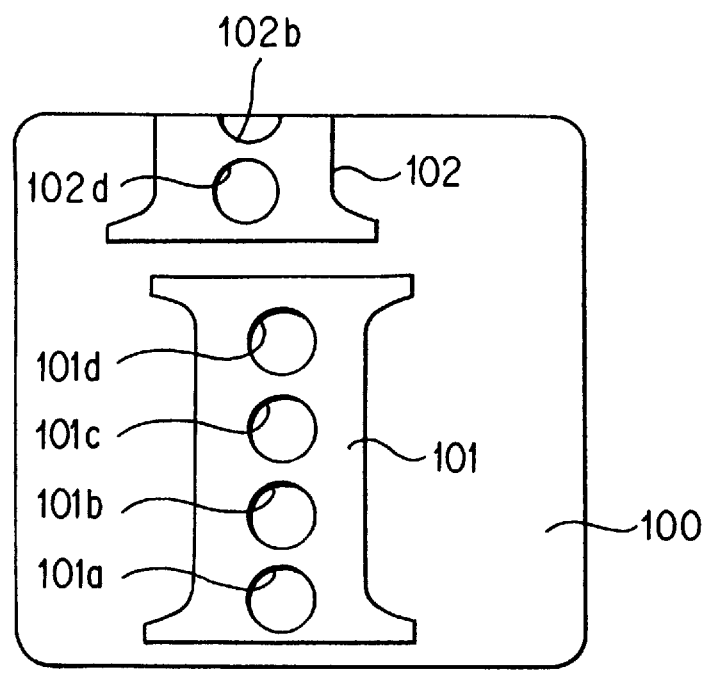
FIG. 23 is a view of an image picked up by a camera.

However, not all of the portions of the image, which are recognized to be of the specific contour, are of a sole cylinder block 70. For example, as shown in FIG. 23, in the case that two cylinder blocks 101 and 102 get into an picture image 100 picked up by the camera 22, there appear portions having the specified contour, i.e. circular portions 101a–101d of one cylinder block 101 and portions having the same specified contour, i.e. circular portions, 102a–102d of the other cylinder block 102 mingled together in the picture image 100. For this reason, only the circular portions of, for instance, a sole cylinder block 101 are discriminated through steps S114 and S115. Then, when all of the circular portions of the sole cylinder block 101 are discriminated, the work position of the sole cylinder block 101 is detected or recognized at step S116. The discrimination of the circular portion is made based on contour characteristic values, and the recognition of the sole cylinder block 70 (cylinder block 101 or 102) or the recognition whether the circular portion belongs to a specific sole cylinder block 70 (cylinder block 101 or 102) is made based on work characteristic values. These characteristic values are previously defined for, for instance, a cylinder block 70 (cylinder block 101 or 102) of an in-line four-cylinder engine and its cylinder bores as follows:

<Contour Characteristic Values>

(1) the area of a circular portion;
(2) the peripheral length of the circular portion;
(3) the contour coefficient which is defined by the ratio of area to peripheral length of the circular portion; and
(4) the diameter of the circular portion in each of two perpendicularly intersecting directions.

<Work Characteristic Values>

(1) the center distance or pitch between the centers of each two adjacent circular portions; and
(2) the angle defined by two straight lines each of which passes through the centers of each two adjacent circular portions.

In connection with the work characteristic values, two specific contour portions may not always be adjacent to each other.

After extracting the contour characteristic values and work characteristic values in connection with the specified contoured portions, namely circular portions, at step S114, a comparison is made between the extracted characteristic values and the reference characteristic values and a decision is made as to whether there is a group of the circular portions having contour and work characteristic values which are coincident with the reference characteristic values at step S115. If the answer to the decision is "NO," this indicates that the initial threshold value TV(i) for the transformation to two-valued image data was improper. Then, the initial threshold value TV(i) is changed as a threshold value TV at step S119. Subsequently, after changing the count "n" by a decrement of one (1) at step S120, control returns the decision concerning the count of "n" at step S110. This is because, if the initial threshold value TV(i) is improperly large or low, the circular portion can not be represented by contour characteristic values coincident with the reference characteristics and, consequently, it can not be properly recognized. The change in threshold value TV is alternately changed increasingly and decreasingly from the initial threshold value TV(i).

Figure 24A:
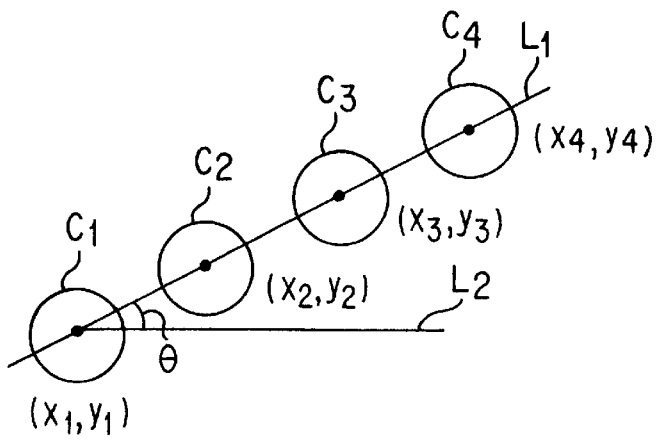
FIG. 24A is an illustration showing a row of cylinder bores of a cylinder block.

If the answer to the decision concerning the existence of a group of the circular portions in the picture image made at step S115 is "YES," this indicates that the group of the circular portions belongs the cylinder block 101 to be transported. Then, the position of the cylinder block 101 in the image is detected based on the work characteristic values of the group of the circular portions at step S116. Here, as shown in FIG. 24A, the position of work in the image is defined by the following characteristic values:

$$X = (x_1 + x_4)/2; \tag{1}$$

$$Y = (y_1 + y_4)/2; \text{ and} \tag{2}$$

$$\Theta + (y_1 - y_4)/(x_1 - x_4) \cdot 180/\pi \tag{3}$$

where

X is the x-coordinate of the center of a cylinder block;

x is the x-coordinate of the center of a circular portion;

Y is the y-coordinate of the cylinder block;

y is the y-coordinate of the center of the circular portion; and $\Theta$ is the angle defined between the straight line L1 passing through the centers of a group of circular portions $C_1$–$C_4$ and a reference (horizontal) straight line L2.

These characteristic values X, Y and $\Theta$ in the image are transformed into actual coordinates X', Y' and $\Theta$ with respect to the work handling apparatus WA at step S117. This transformation is made by the following formulas:

$$X' = (x\text{-origin} - X) \cdot M + Fx; \tag{4}$$

$$Y' = (y\text{-origin} - Y) \cdot M + Fy; \text{ and} \tag{5}$$

$$\Theta' = \Theta + F_\Theta \tag{6}$$

where M is the magnification of the camera 22; and

F is the offset of the camera 22 from the original point. In this instance, the drive motors 11, 15, 18 and 21 are provided with limit switches and encoders (not shown), respectively. The limit switches detect original positions of the camera 22 in X, Y and Z directions. Distances from the respective original positions in X, Y and Z directions are represented by numbers of pulses provided from the encoders.

Thereafter, the distance of movement of the work hand 20 is calculated based on the actual coordinates X', Y' and Θ' at step S117 and a signal representative of the distance is provided at step S118. At the end of the image processing and work position determination subroutine, control orders return to the transportation control main routine.

With the image processing and work position determination, even if a picture image picked up by the camera 22 includes images of a plurality of cylinder blocks 70, only a group of circular portions of a sole cylinder block 70 is discriminated from others and the position of the sole cylinder block 70 is accurately detected based on the characteristic values of the group of specific contour portions. Accordingly, the work hand 20 is accurately positioned right above the cylinder block 101 to be transported and holds it properly. Furthermore, since the threshold value for the transformation of image data into two-valued image data is changed according to a change in the luminance of the top surface of a cylinder block as cylinder blocks and pallets of the stack are transported one after another, the position of a cylinder block to be transported is accurately detected.

Now, a description is made to various works 3, such as primary shafts, cylinder heads and transmission cases. Because the transportation control for cylinder blocks shown in FIG. 11 is entirely applied to these primary shafts, and the image processing control for cylinder blocks shown in FIG. 12 basically takes place for these primary shafts, cylinder heads and transmission cases, the following description will be directed to functions different from those of the image processing and work position determination subroutines shown in FIG. 12.

Figure 18:
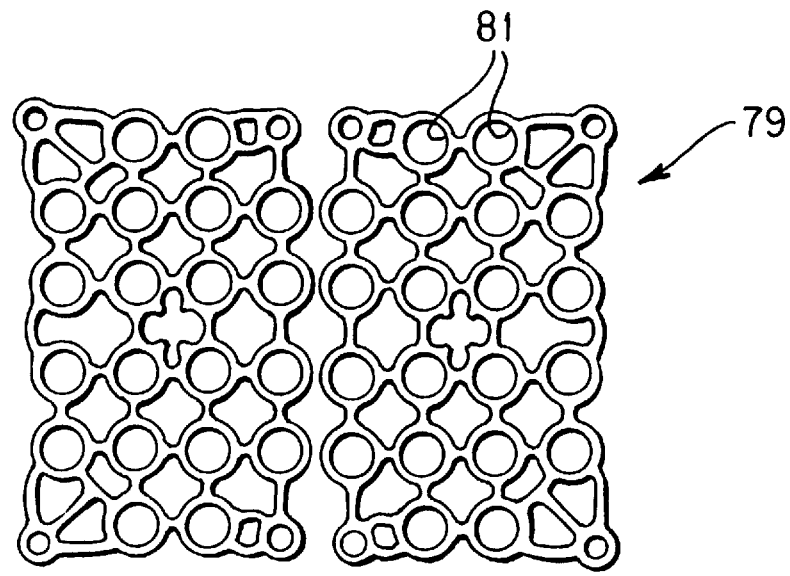
FIG. 18 is a plan view of an upper plate of the primary shaft supporting case of FIG. 16.
Figure 19:
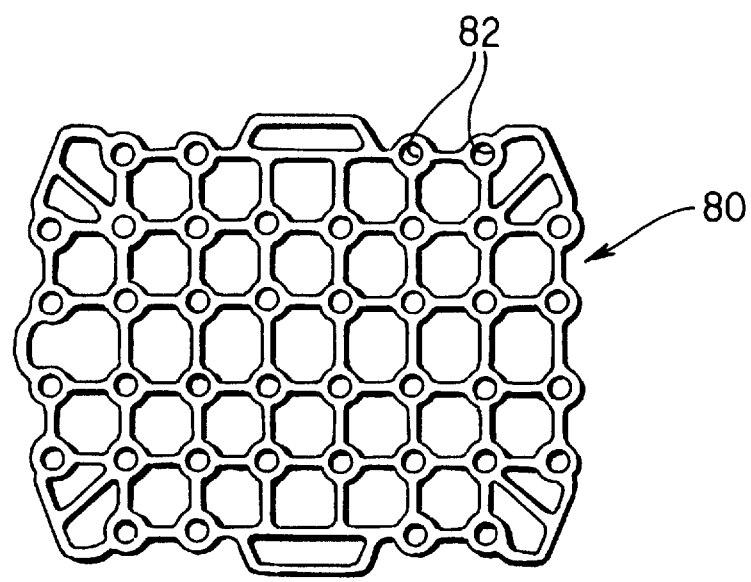
FIG. 19 is a plan view of a lower plate of the primary shaft supporting case of FIG. 16.
Figure 20A:
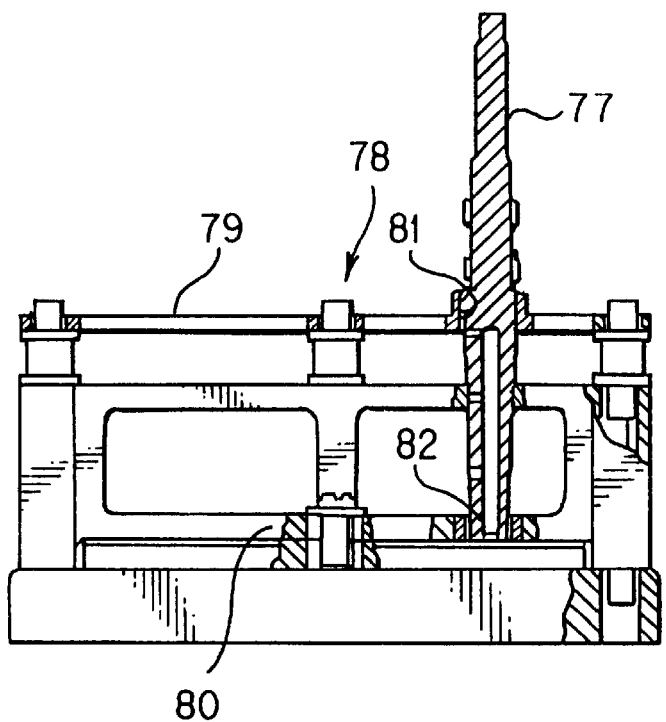
FIG. 20A is a cross sectional view of a part of the primary shaft supporting case in which primary shafts are incorporated.
Figure 20B:
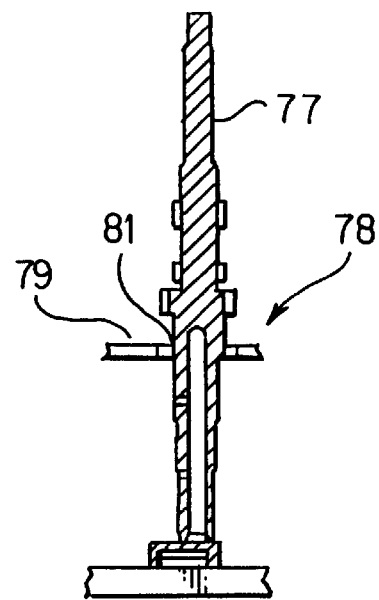
FIG. 20B is a cross sectional view of a part of the primary shaft supporting case around a primary shaft.
Figure 20C:
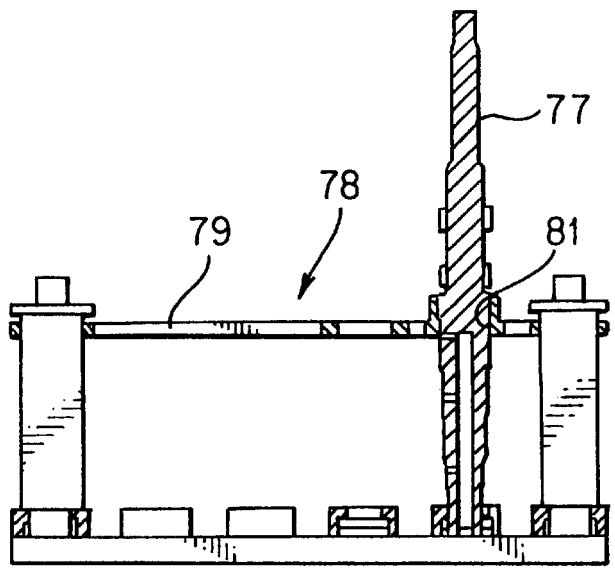
FIG. 20C is a vertical sectional view of the primary shaft supporting case of FIG. 20A.

If the primary shafts 77, such as those shown in FIG. 15, are handled as works 3, they are set in a supporting case 78 such as that shown in FIGS. 16 and 17 by the work transporting apparatus WA. Specifically, the supporting case 78 has upper and lower supporting plates 79 and 80. As shown in FIG. 18, the upper supporting plate 79 is formed with a plurality of holes 81. Similarly, as shown in FIG. 19, the lower supporting plate 80 is formed with a plurality of holes 82 which correspond in position to the holes 81 of the upper supporting plate 81, respectively, and have a diameter smaller than that of the holes 81 of the upper supporting plate 81. The work transporting apparatus WA holds the primary shaft 77 and places it vertically in the upper and lower holes 81 and 82 as shown in FIGS. 20A–20C. In order to transport the primary shaft 77 and install it in the supporting case 78 in such a manner, the work transporting apparatus WA detects the position of upper hole 81 and inserts the primary shaft 77 through the upper hole 81. For this purpose, the upper holes 81 are discriminated as a specific contour portions.

Figure 21C:
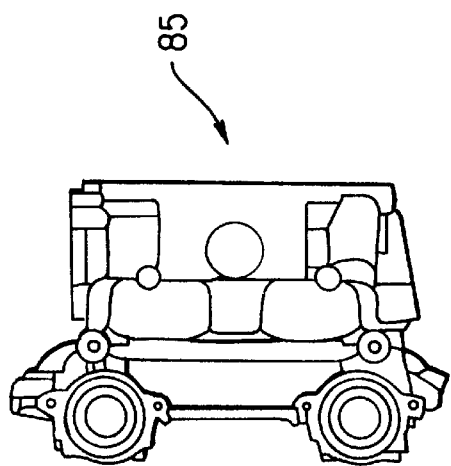
FIG. 21C is a front view of the cylinder head of FIG. 21A.
Figure 21A:
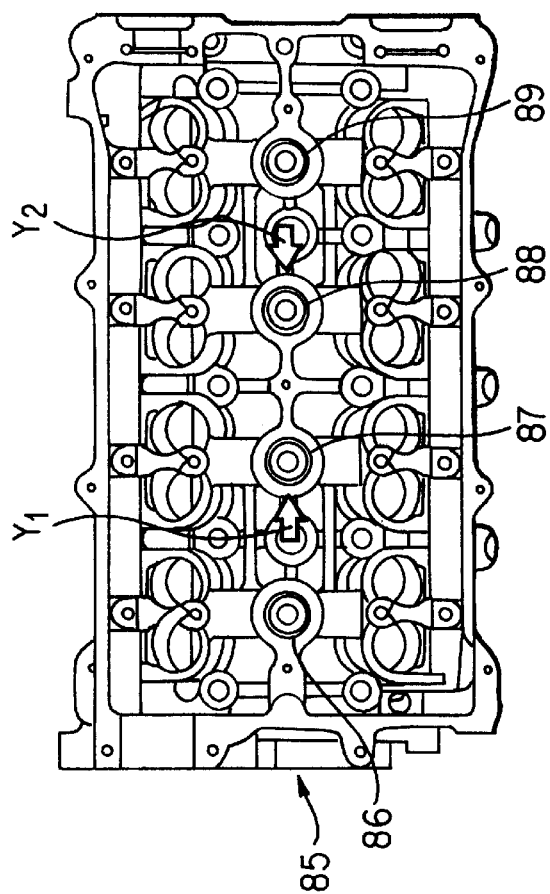
FIG. 21A is a plan view of a cylinder head.
Figure 21B:
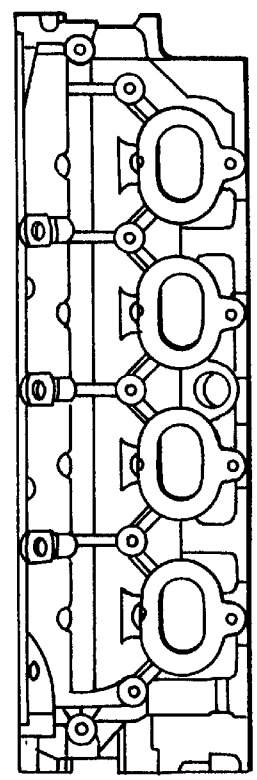
FIG. 21B is a side view of the cylinder head of FIG. 21A.
Figure 22A:
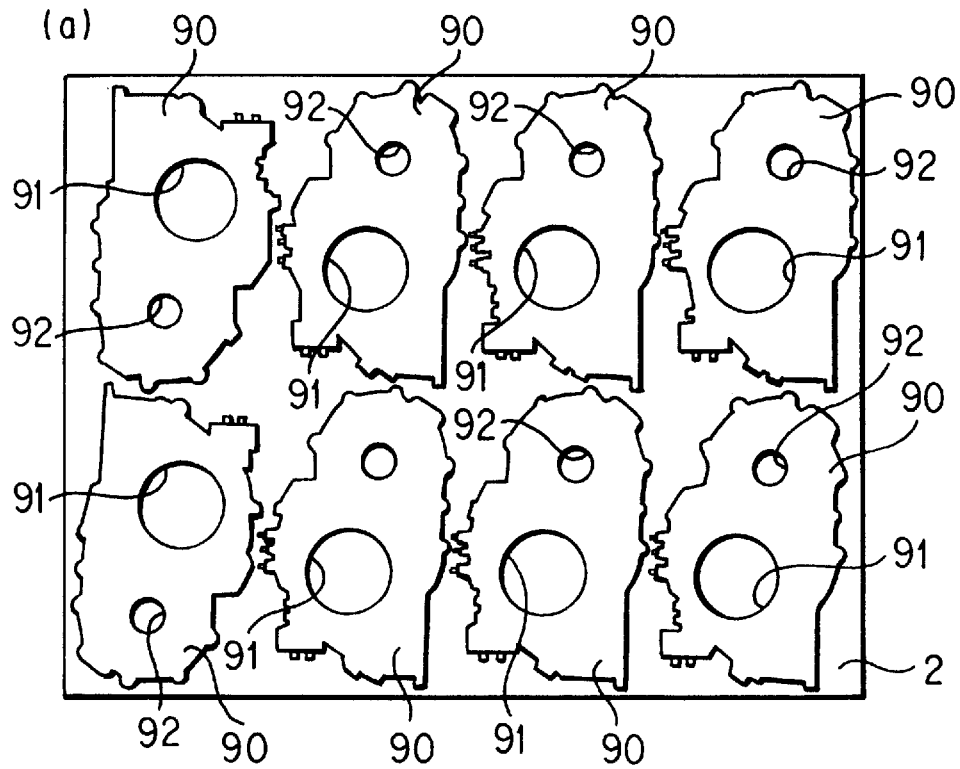
FIG. 22A is a plan view of a stack of panels on which transmission cases are placed.
Figure 22B:
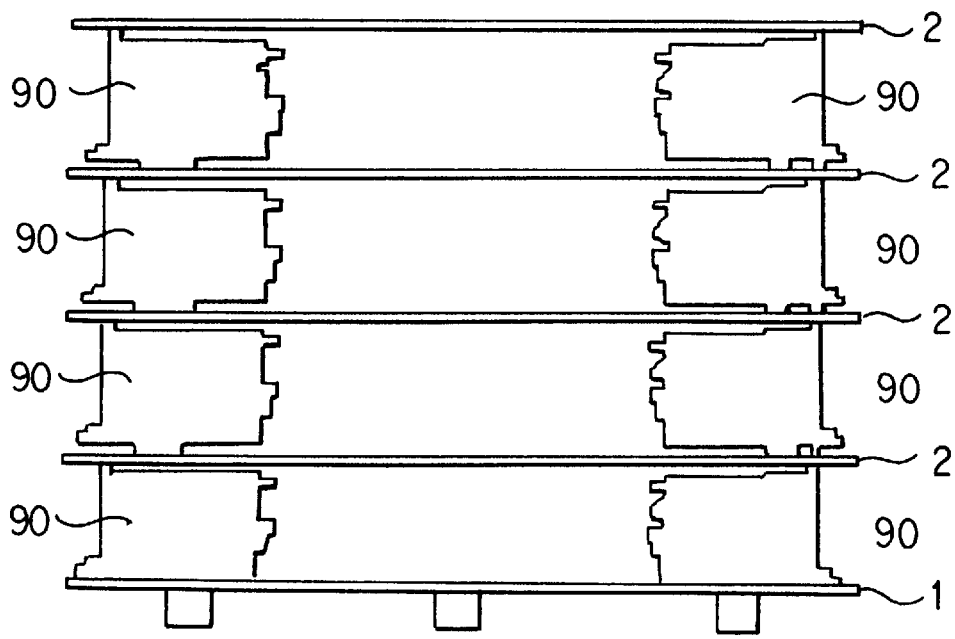
FIG. 22B is a side view of the stack of pallets.

If the cylinder heads 85, such as those shown in FIGS. 21A–21C, are handled as works 3, then holes 86–89 for spark plugs are discriminated as specific contour portions. Such a cylinder head 85 is held by the work hand 20 through engagement between fingers of the work hand 20 and the spark plug holes 87 and 88 as shown by arrows Y1 and Y2. Further, if transmission cases 90, such as those shown in FIGS. 22A and 22B, are handled as works 3, large and small holes 91 and 92 are discriminated as a specific contour portions.

An image processing and work position determination subroutine applied to these primary shafts 77, cylinder heads 85 and transmission cases 90 is different in setting of an initial threshold value TV(i).

Figure 13:
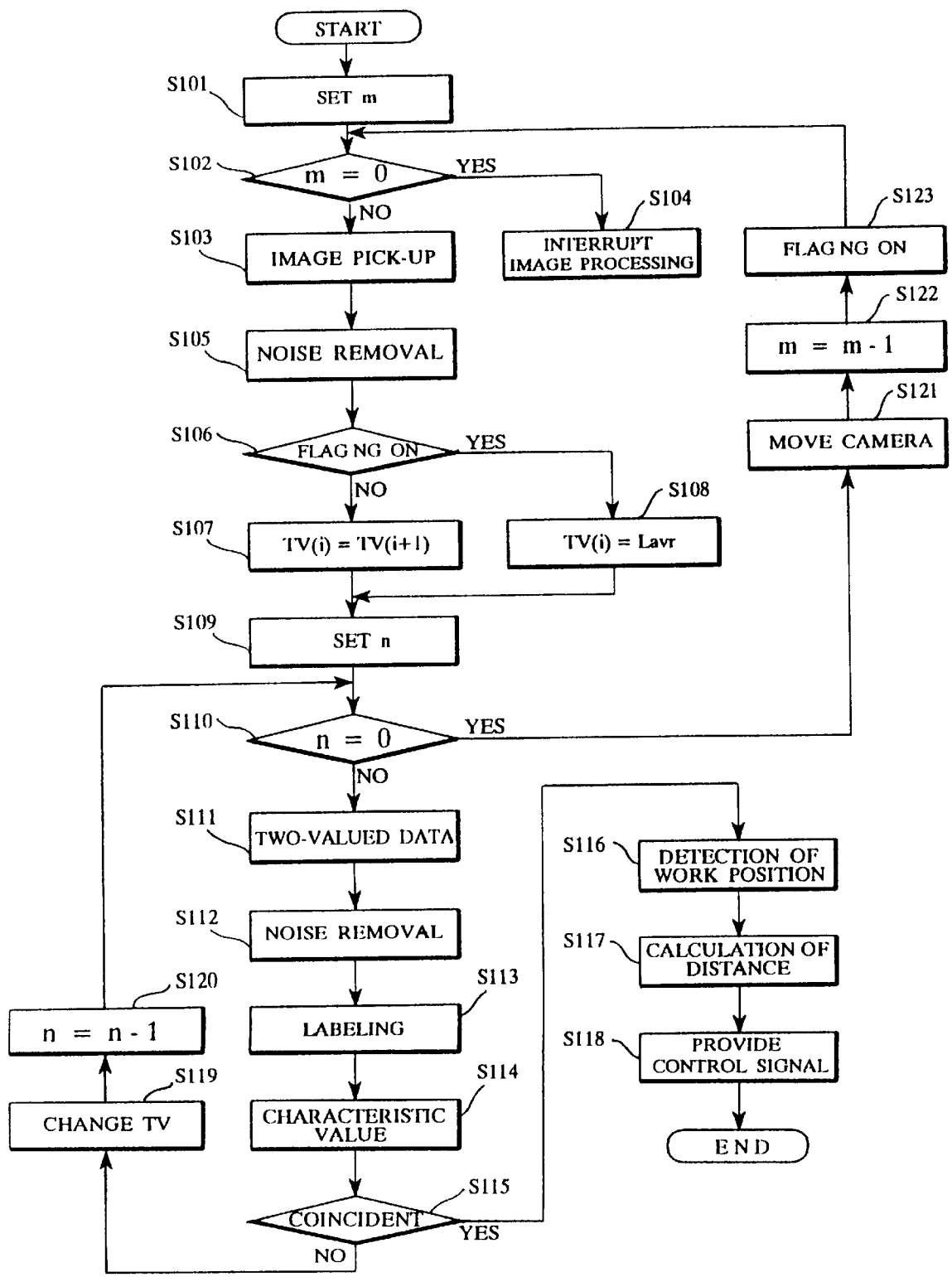
FIG. 13 is a flow chart illustrating an image processing and work position detecting subroutine for a microcomputer of the control system, which is applied to works such as engine cylinder heads, primary shafts and transmission cases.

Referring to FIG. 13, which is a flow chart of the image processing and work position determination subroutine for the primary shafts 77, cylinder heads 85 and transmission cases 90, after removing noises from image data at step S105, the control proceeds directly to a function S130 at which an initial threshold value TV(i) is set for the transformation of many-valued image data into two-valued image data. The initial threshold value TV(i) is obtained from the following formula:

$$TV(i) = \underline{a} \cdot L\max + \underline{b} \cdot L\min + \underline{c} \quad (7)$$

where Lmax is the maximum luminance of the chiaroscuro image picked up by the camera;

Lmin is the minimum luminance of the chiaroscuro image picked up by the camera; and $\underline{a}$, $\underline{b}$ and $\underline{c}$ are the coefficients peculiar to the type of work.

These coefficients $\underline{a}$, $\underline{b}$ and $\underline{c}$ are different and set according to types of works, such as the primary shaft 77, cylinder head 85 and transmission case 90. If the position of the work is unsuccessfully detected, the initial threshold value TV(i) is changed at step S119 similarly to the image processing and work position determination subroutine shown in FIG. 12. Since the initial threshold value TV(i) is obtained unconditionally from formula (7) above and is irrespective of an unsuccessful detection of work position, setting of the flag NG indicative of the unsuccessful detection of work position is not called for. The reason of the use of the formula (7) is that each type of work has a top surface whose average luminance is irregular. The average luminance will possibly lead to an unsuccessful detection of work position. By contrast, the use of the formula (7) provides the initial threshold value TV(i) leading to an easy and successful detection of work position.

In this instance, characteristic values are previously defined for the primary shaft 77 as follows:

<Contour Characteristic Values>

(1) the area of a circular portion (upper hole);

(2) the peripheral length of the circular portion; and (3) the contour coefficient which is defined by the ratio of area to peripheral length of the circular portion.

<Work Characteristic Value>

Figure 24B:
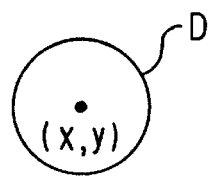
FIG. 24B is an illustration showing a hole of an upper plate of a primary shaft supporting case.

(1) the position of each upper hole 81 is detected based only on the coordinates (x, y) of the center of each circular portion D as shown in FIG. 24B.

Characteristic values are previously defined for the cylinder head 85 as follows:

<Contour Characteristic Values>

(1) the area of a circular portion (spark plug hole);

(2) the peripheral length of the circular portion; and (3) the contour coefficient which is defined by the ratio of area to peripheral length of the circular portion.

<Work Characteristic Values>

(1) the center distance or pitch between the centers of two circular portions;

(2) the angle defined by two straight lines each of which passes through the centers of two circular portions; and (3) the segment of a straight line connecting the centers of two circular portions.

Figure 24C:
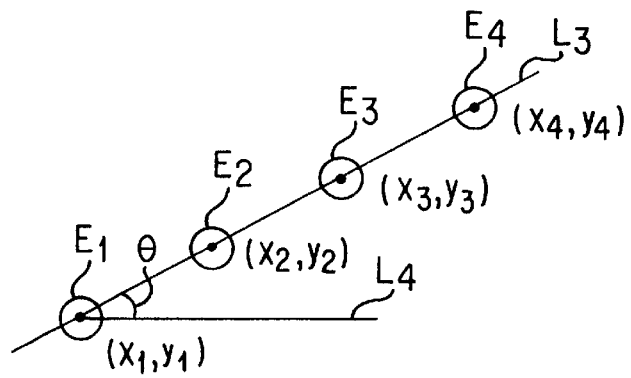
FIG. 24C is an illustration showing a row of spark plug bores of a cylinder head.

As shown in FIG. 24C, the position of work in the image is defined by the following characteristic values:

$$X=(x_1+x_2+x_3+x_4)/4; \quad (8)$$

$$Y=(y_1+y_2+y_3+y_4)/4; \text{ and} \quad (9)$$

$$\Theta+(y_1-y_4)/(x_1-x_4)\cdot 180/\pi \quad (10)$$

where

X is the x-coordinate of the center of a cylinder head;

x is the x-coordinate of the center of a circular portion;

Y is the y-coordinate of the cylinder head;

y is the y-coordinate of the center of the circular portion; and

Θ is the angle defined between the straight line L3 passing through the centers of a group of circular portions $E_1$–$E_4$ and a reference (horizontal) straight line L4.

Characteristic values are previously defined for the transmission case 90 as follows:

<Contour Characteristic Values>

(1) the area of a circular portion (large or small hole);

(2) the peripheral length of the circular portion;

(3) the contour coefficient which is defined by the ratio of area to peripheral length of the circular portion; and (4) the diameter of the circular portion in each of two perpendicularly intersecting directions.

<Work Characteristic Value>

(1) the center distance or pitch between the centers of two circular portions.

Figure 24D:
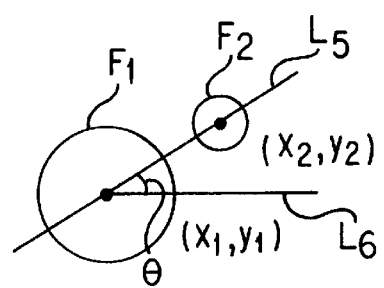
FIG. 24D is an illustration showing bores of a transmission case.

As shown in FIG. 24D, the position of work in the image is defined by the following characteristic values:

$$X=x_1; \quad (11)$$

$$Y=y_1; \text{ and} \quad (12)$$

$$\Theta+(y_2-y_1)/(x_2-x_1)\cdot 180/\pi \quad (13)$$

where

X is the x-coordinate of the center of a transmission case;

x is the x-coordinate of the center of a circular portion;

Y is the y-coordinate of the transmission case;

y is the y-coordinate of the center of the circular portion; and

Θ is the angle defined between the straight line L5 passing through the centers of a group of circular portions $F_1$ and $F_2$ and a reference (horizontal) straight line L6.

All other functions of the image processing and work position determination subroutine of FIG. 13 are just similar to those of FIG. 12.

It is to be understood that although the present invention has been described with regard to preferred embodiments thereof, various other embodiments and variants may occur to those skilled in the art which are within the scope and spirit of the invention. Such other embodiments and variants are intended to be covered by the following claims.

What is claimed is:

1. A method of discerning a specific subject work from a plurality of subject works of the same type, each of said subject works including a plurality of specified distinctive geometric patterns, which are separated from one another and specified by a predetermined quantitative distinction independent from said specified distinctive geometric patterns and form part of the whole surface thereof and being placed on a pallet, and handling said specific subject work so as to transport said specific subject work from said pallet to a predetermined position remote from said pallet, said method comprising the steps of:

positioning a camera so as to pick up an image of a predetermined area including at least one of said subject works;

processing said image to retrieve a quantitative distinction of each of said geometric patterns included in said image;

comparing said quantitative distinction retrieved from the geometric pattern included in said image with said predetermined quantitative distinction to recognize each geometric pattern in said image as one of said specified distinctive geometric patterns when said quantitative distinction retrieved from said image is within predetermined limits of said predetermined quantitative distinction;

detecting a relative position of at least two geometric patterns included in said image which are recognized as said specified distinctive geometric patterns;

comparing said relative position with a predetermined reference position and identifying a subject work which includes at least two distinctive geometric patterns having a relative position coincident with said predetermined reference position as said specific subject work, thereby discerning said specific subject work from the other subject works;

recognizing a position of said specific subject work based on said relative positions of said specified distinctive geometric patterns belonging to said specific subject work; and shifting a handling device having a pick-up head engageable with said specific subject work to said position of said specific subject work and causing said handling device to pick up said specific subject work from said pallet by engaging said specific subject work at said two geometric patterns and transport said specific subject work from said pallet to said predetermined position.

2. A method as defined in claim 1, wherein each of said specified distinctive geometric patterns is defined as a specified point on a simple geometric figure.

3. An apparatus for discerning a specific subject work from a plurality of subject works of the same type, each of said subject works including a plurality of specified distinctive geometric patterns, which are separated from one another and specified by a predetermined quantitative distinction independent from said specified distinctive geometric patterns and form part of the whole surface thereof and placed on a pallet, and for transporting said specific subject work with a handling device having a pick-up head engageable with said specific subject work which includes two of said specified distinctive geometric patterns from said pallet to a predetermined position remote from said pallet, said apparatus comprising:

image forming means for forming an image of a predetermined area including at least one of said subject works;

image processing means for processing said image to retrieve a quantitative distinction of each of said geometric patterns included in said image; and controlling means for comparing said quantitative distinction retrieved from the geometric pattern included in said image with said predetermined quantitative distinction to recognize each said geometric pattern in said image as one of said specified distinctive geometric patterns when said quantitative distinction retrieved from said image is within predetermined limits of said predetermined quantitative distinction, detecting a relative position of at least two of said specified distinctive geometric patterns included in said image which are recognized as said specified distinctive geometric patterns, comparing said relative position with a predetermined reference position and identifying a subject work which includes at least two distinctive geometric patterns having a relative position coincident with said predetermined reference position as said specific subject work, thereby discerning said specific subject work from the other subject works, recognizing a position of said specific subject work based on said relative positions of said specified distinctive geometric patterns belonging to said specified subject work, shifting a handling device having a pick-up head engageable with said specific subject work to said position of said specific subject work, and causing said handling device to pick up said specific subject work from said pallet by engaging said specific subject work at said two specified distinctive geometric patterns and transport said specific subject work from said pallet to said predetermined position.

4. An apparatus as defined in claim 3, wherein each of said specified distinctive geometric patterns is defined as a specified point on a simple geometric figure.

5. An apparatus as defined in claim 3, wherein image processing is made by transforming many-valued data representative of said image into two-valued data with a threshold value.

6. An apparatus as defined in claim 5, wherein said threshold value is changed from an initially established threshold value when said relative position is not comparable with said reference position.

7. An apparatus as defined in claim 5, wherein said image forming means is changeable in focal length.

8. An apparatus as defined in claim 7, wherein said image forming means zooms in said image after a predetermined number of said changes of threshold value.

9. An apparatus as defined in claim 8, wherein said initially established threshold value is changed after said predetermined number of said changes of threshold value.

10. A method as defined in claim 1, wherein said at least two of said specified distinctive geometric patterns are adjacent to each other.

11. A method as defined in claim 1, wherein said specified distinctive geometric pattern is isolated inside from a contour of said whole surface of said specific subject work.

12. A method as defined in claim 1, wherein said specified distinctive geometric pattern is defined as a specified point on a simple geometric figure.

13. A method as defined in claim 1, wherein said specified distinctive geometric pattern is isolated inside from a contour of said whole surface of said subject work and defined as a specified point on a simple geometric figure.

14. A method as defined in claim 1, wherein each of said specified distinctive geometric patterns is defined as a specified point on a simple geometric figure, said relative position being defined by a distance between specified points of each of two simple geometric figures and compared with a predetermined distance.

15. A method as defined in claim 1, wherein each of said specified distinctive geometric patterns is defined as a specified point on a simple geometric figure, said relative position being defined by an angle between a straight line connecting specified points of each of two simple geometric figures and a straight line connecting specified points of another two simple geometric figures and compared with a predetermined angle.

16. A method as defined in claim 1, wherein each of said specified distinctive geometric patterns is isolated inside from a contour of said whole surface of said specific subject work and defined as a specified point on a simple geometric figure, said relative position being defined by a distance between specified points of each of two simple geometric figures and compared with a predetermined distance.

17. A method as defined in claim 1, wherein each of said specified distinctive geometric patterns is isolated inside from a contour of said whole surface of said specific subject work and defined as a specified point on a simple geometric figure, said relative position being defined by an angle between a straight line connecting specified points of each of two simple geometric figures and a straight line connecting specified points of another two simple geometric figures and compared with a predetermined angle.

18. A method as defined in claim 16, wherein said simple geometric figure is defined as a contour of a bore formed in said specific subject work.

19. A method as defined in claim 17, wherein said simple geometric figure is defined as a contour of a bore formed in said specific subject work.

20. A method of discerning a specific subject work from a plurality of subject works of the same type, each of said subject works including a plurality of specified distinctive geometric patterns, separated from one another, forming parts of the whole surface thereof and being placed on a pallet, and handling said specific subject work so as to transport said specific subject work from said pallet to a predetermined position remote from said pallet, said method comprising the steps of:

positioning a camera so as to pick up an image of a predetermined area including at least one of said subject works;

processing said image to recognize each of said specified distinctive geometric patterns;

detecting a relative position of at least two of said specified distinctive geometric patterns;

comparing said relative position of said at least two of said specified distinctive geometric patterns with a predetermined reference position and identifying a subject work which includes at least two distinctive geometric patterns having a relative position coincident with said predetermined reference position as said specific subject work, thereby discerning said specific subject work from the other subject works;

recognizing a position of said specific subject work based on said relative positions of said specified distinctive geometric patterns belonging to said specific subject work; and shifting a handling device to said position of said specific subject work and causing said handling device to pick up and transport said specific subject work from said pallet to said predetermined position;

wherein each of said specified distinctive geometric patterns is isolated inside from a contour of said whole surface of said specific subject work and defined as a specified point on a simple geometric figure, said relative position being defined by a distance between specified points of each of two simple geometric figures and compared with a predetermined distance;

wherein said simple geometric figure is defined as a contour of a bore formed in said specific subject work; and wherein said specific subject work has at least four bores, at least two of said bores being engaged by positioning means of said handling device for positioning said handling device and at least two other bores, symmetrical in position with respect to a geometric center of said subject work, being engaged by pick-up means of said handling device.

21. A method of discerning a specific subject work from a plurality of subject works of the same type, each of said subject works including a plurality of specified distinctive geometric patterns, separated from one another, forming parts of the whole surface thereof and being placed on a pallet, and handling said specific subject work so as to transport said specific subject work from said pallet to a predetermined position remote from said pallet, said method comprising the steps of:

positioning a camera so as to pick up an image of a predetermined area including at least one of said subject works;

processing said image to recognize each of said specified distinctive geometric patterns;

detecting a relative position of at least two of said specified distinctive geometric patterns;

comparing said relative position of said at least two of said specified distinctive geometric patterns with a predetermined reference position and identifying a subject work which includes at least two distinctive geometric patterns having a relative position coincident with said predetermined reference position as said specific subject work, thereby discerning said specific subject work from the other subject works;

recognizing a position of said specific subject work based on said relative positions of said specified distinctive geometric patterns belonging to said specific subject work; and shifting a handling device to said position of said specific subject work and causing said handling device to pick up and transport said specific subject work from said pallet to said predetermined position;

wherein each of said specified distinctive geometric patterns is isolated inside from a contour of said whole surface of said specific subject work and defined as a specified point on a simple geometric figure, said relative position being defined by an angle between a straight line connecting specified points of each of two simple geometric figures and a straight line connecting specified points of another two simple geometric figures and compared with a predetermined angle;

wherein said simple geometric figure is defined as a contour of a bore formed in said specific subject work; and wherein said specified subject work has at least four bores, at least two of said bores being engaged by positioning means of said handling device for positioning said handling device and at least two other bores, symmetrical in position with respect to a geometric center of said subject work, being engaged by pick-up means of said handling device.

22. A method as defined in claim 20, wherein said specific subject work is a cylinder head formed with more than four bores, for receiving spark plugs, respectively, two inner bores of said more than four bores being engaged by said positioning means and two outer bores of said more than four bores being engaged by said pick-up means.

23. A method as defined in claim 20, wherein said specific subject work is a cylinder block formed with more than four cylinder bores, two inner cylinder bores of said more than four cylinder bores being engaged by said positioning means and two outer cylinder bores of said more than four cylinder bores being engaged by said pick-up means.

24. A method as defined in claim 21, wherein said specific subject work is a cylinder head formed with more than four bores, for receiving spark plugs, respectively, two inner bores of said more than four bores being engaged by said positioning means and two outer bores of said more than four bores being engaged by said pick-up means.

25. A method as defined in claim 21, wherein said specific subject work is a cylinder block formed with more than four cylinder bores, two inner cylinder bores of said more than four cylinder bores being engaged by said positioning means and two outer cylinder bores of said more than four cylinder bores being engaged by said pick-up means.

26. An apparatus as defined in claim 3, wherein said at least two of said specified distinctive geometric patterns are adjacent to each other.

27. An apparatus as defined in claim 3, wherein each of said specified distinctive geometric patterns is isolated inside from a contour of the whole surface of said specific subject work.

28. An apparatus as defined in claim 3, wherein each of said specified distinctive geometric patterns is defined as a specified point on a simple geometric figure.

29. An apparatus as defined in claim 3, wherein each of said specified distinctive geometric patterns is isolated inside from a contour of the whole surface of said specific subject work and defined as a specified point on a simple geometric figure.

30. An apparatus as defined in claim 3, wherein each of said specified distinctive geometric patterns is defined as a specified point on a simple geometric figure, said relative position being defined by a distance between specified points of each of two simple geometric figures and compared with a predetermined distance.

31. An apparatus as defined in claim 3, wherein each of said specified distinctive geometric patterns is defined as a specified point on a simple geometric figure, said relative position being defined by an angle between a straight line connecting specified points of each of two simple geometric figures and a straight line connecting specified points of another two simple geometric figures and compared with a predetermined angle.

32. An apparatus as defined in claim 3, wherein each of said specified distinctive geometric patterns is isolated inside from a contour of said whole surface of said specific subject work and defined as a specified point on a simple geometric figure, said relative position being defined by a distance between specified points of each of two simple geometric figures and compared with a predetermined distance.

33. An apparatus as defined in claim 3, wherein each of said specified distinctive geometric patterns is isolated inside from a contour of said whole surface of said specific subject work and defined as a specified point on a simple geometric figure, said relative position being defined by an angle between a straight line connecting specified points of each of two simple geometric figures and a straight line connecting specified points of another two simple geometric figures and compared with a predetermined angle.

34. An apparatus as defined in claim 32, wherein said simple geometric figure is defined as a contour of a bore formed in said specific subject work.

35. An apparatus as defined in claim 33, wherein said simple geometric figure is defined as a contour of a bore formed in said specific subject work.

36. An apparatus for discerning a specific subject work from a plurality of subject works of the same type, each of said subject works including a plurality of specified distinctive geometric patterns, separated from one another, forming parts of the whole surface thereof and placed on a pallet, and transporting said specific subject work with a handling device from said pallet to a predetermined position remote from said pallet, said apparatus comprising:

image forming means for forming an image of a predetermined area including at least one of said subject works;

image processing means for recognizing each of said specified distinctive geometric patterns; and controlling means for detecting a relative position of two of said specified distinctive geometric patterns, comparing said relative position of said two of said specified distinctive geometric patterns with a predetermined reference position and identifying a subject work which includes said two of said specified distinctive geometric patterns having a relative position coincident with said predetermined reference position as said specific subject work, thereby discerning and recognizing a position of said specific subject work based on said relative positions of said specified distinctive geometric patterns belonging to said specified subject work, causing said handling device to pick up and transport said specific subject work to said predetermined position;

wherein each of said specified distinctive geometric patterns is isolated inside from a contour of said whole surface of said specific subject work and defined as a specified point on a simple geometric figure, said relative position being defined by a distance between specified points of each of two simple geometric figures and compared with a predetermined distance;

wherein said simple geometric figure is defined as a contour of a bore formed in said specific subject work; and wherein said specific subject work has at least four bores, said handling means having positioning means engageable with at least two of said at least four bores for positioning said handling device and pick-up means engageable with at least two others of said at least four bores symmetrical in position with respect to a geometric center of said specific subject work for picking up said specific subject work.

37. An apparatus for discerning a specific subject work from a plurality of subject works of the same type, each of said subject works including a plurality of specified distinctive geometric patterns, separated from one another, forming parts of the whole surface thereof and placed on a pallet, and transporting said specific subject work with a handling device from said pallet to a predetermined position remote from said pallet, said apparatus comprising:

image forming means for forming an image of a predetermined area including at least one of said subject works;

image processing means for recognizing each of said specified distinctive geometric patterns; and controlling means for detecting a relative position of two of said specified distinctive geometric patterns, comparing said relative position of said two of said specified distinctive geometric patterns with a predetermined reference position and identifying a subject work which includes said two of said specified distinctive geometric patterns having a relative position coincident with said predetermined reference position as said specific subject work, thereby discerning and recognizing a position of said specific subject work based on said relative positions of said specified distinctive geometric patterns belonging to said specified subject work, causing said handling device to pick up and transport said specific subject work to said predetermined position;

wherein each of said specified distinctive geometric patterns is isolated inside from a contour of said whole surface of said specific subject work and defined as a specified point on a simple geometric figure, said relative position being defined by an angle between a straight line connecting specified points of each of two simple geometric figures and a straight line connecting specified points of another two simple geometric figures and compared with a predetermined angle;

wherein said simple geometric figure is defined as a contour of a bore formed in said specific subject work; and wherein said specific subject work has at least four bores, said handling means having positioning means engageable with at least two of said at least four bores for positioning said handling device and pick-up means engageable with at least two others of said at least four bores symmetrical in position with respect to a geometric center of said specific subject work for picking up said specific subject work.

38. A method as defined in claim 1, wherein said at least two of said specified distinctive geometric patterns are defined by holes.

39. A method as defined in claim 38, wherein said processing of said image is made by transforming many-valued data representative of said image into two-valued data with a threshold value.

40. A method as defined in claim 39, wherein said threshold value is changed from an initially established threshold value when said relative position is not comparable with said reference position.

41. A method as defined in claim 40, wherein said initially established threshold value is changed after a predetermined number of changes of said threshold value.

42. A method as defined in claim 38, wherein said specific subject work is a cylinder head formed with a bore, for receiving a spark plug, having a circular contour.

43. A method as defined in claim 38, wherein said specific subject work is a cylinder block formed with a cylinder bore having a circular contour.

44. A method as defined in claim 20, wherein said processing of said image is made by transforming many-valued data representative of said image into two-valued data with a threshold value.

45. A method as defined in claim 44, wherein said threshold value is changed from an initially established threshold value when said relative position is not comparable with said reference position.

46. A method as defined in claim 45, wherein said initially established threshold value is changed after a predetermined number of changes of said threshold value.

47. A method as defined in claim 20, wherein said specific subject work is a cylinder head formed with a bore, for receiving a spark plug, having a circular contour.

48. A method as defined in claim 20, wherein said specific subject work is a cylinder block formed with a cylinder bore having a circular contour.

49. A method as defined in claim 21, wherein said processing of said image is made by transforming many-valued data representative of said image into two-valued data with a threshold value.

50. A method as defined in claim 49, wherein said threshold value is changed from an initially established threshold value when said relative position is not comparable with said reference position.

51. A method as defined in claim 50, wherein said initially established threshold value is changed after a predetermined number of changes of said threshold value.

52. A method as defined in claim 21, wherein said specific subject work is a cylinder head formed with a bore, for receiving a spark plug, having a circular contour.

53. A method as defined in claim 21, wherein said specific subject work is a cylinder block formed with a cylinder bore having a circular contour.

54. An apparatus as defined in claim 36, wherein said image processing means transforms many-valued data representative of said image into two-valued data with a threshold value.

55. An apparatus as defined in claim 54, wherein said threshold value is changed from an initially established threshold value when said relative position is not comparable with said reference position.

56. An apparatus as defined in claim 55, wherein said initially established threshold value is changed after a predetermined number of changes of said threshold value.

57. An apparatus as defined in claim 36, wherein said specific subject work is a cylinder head formed with a bore, for receiving a spark plug, having a circular contour.

58. An apparatus as defined in claim 36, wherein said specific subject work is a cylinder block formed with a cylinder bore having a circular contour.

59. An apparatus as defined in claim 57, wherein said image processing means transforms many-valued data representative of said image into two-valued data with a threshold value.

60. An apparatus as defined in claim 59, wherein said threshold value is changed from an initially established threshold value when said relative position is not comparable with said reference position.

61. An apparatus as defined in claim 60, wherein said initially established threshold value is changed after a predetermined number of changes of said threshold value.

62. An apparatus as defined in claim 37, wherein said specific subject work is a cylinder head formed with a bore, for receiving a spark plug, having a circular contour.

63. An apparatus as defined in claim 37, wherein said specific subject work is a cylinder block formed with a cylinder bore having a circular contour.

64. A method of discerning a specific subject work from a plurality of subject works of the same type, each of said subject works including a plurality of specified distinctive geometric patterns, which are separated from one another and specified by a predetermined quantitative distinction independent from said specified distinctive geometric patterns, and form part of the whole surface thereof and being placed on a pallet, and handling said specified subject work to transport said specific subject work from said pallet to a predetermined position remote from said pallet, said method comprising the steps of:

positioning a camera so as to pick up an image of a predetermined area including at least one of said subject works;

processing said image to retrieve a quantitative distinction of each said geometric pattern included in said image;

comparing said quantitative distinction retrieved from said geometric pattern included in said image with said predetermined quantitative distinction to recognize each said geometric pattern in said image as said specified distinctive geometric pattern when said quantitative distinction retrieved from said image is within predetermined limits of said predetermined quantitative distinction;

detecting a relative position between at least two said geometric patterns included in said image which are recognized as said specified distinctive geometric pattern;

comparing said relative position with a predetermined reference position and identifying a subject work which includes at least two distinctive geometric patterns having a relative position coincident with said predetermined reference position as a specified subject work, thereby discerning said specific subject work from the other subject works; and recognizing a position of said specific subject work based on said relative position of said specified distinctive geometric patterns belonging to said specific subject work.

65. An apparatus for discerning a specific subject work from a plurality of subject works of the same type, each of said subject works including a plurality of specified distinctive geometric patterns, which are separated from one another and specified by a predetermined quantitative distinction independent from said specified distinctive geometric pattern and form part of the whole surface thereof, and being placed on a pallet, and for transporting a specified subject work with a handling device having a pick-up head engageable with said specific subject work which includes two said specified distinctive geometric patterns from said pallet to a predetermined position remote from said pallet, said apparatus comprising:

image forming means for forming an image of a predetermined area including at least one of said subject works;

image processing means for processing said image to retrieve a quantitative distinction of each said geometric pattern included in said image; and identifying means for comparing said quantitative distinction retrieved from said geometric pattern included in said image with said predetermined quantitative distinction to recognize each said geometric pattern in said image as said specified distinctive geometric pattern when said quantitative distinction retrieved from said image is within predetermined limits of said predetermined quantitative distinction, detecting a relative position between at least two said geometric patterns included in said image which are recognized as said specified distinctive geometric pattern, comparing said relative position with a predetermined reference position and identifying a subject work which includes at least two distinctive geometric patterns having a relative position coincident with said predetermined reference position as a specified subject work so as thereby to discern said specific subject work from the other subject works, and recognizing a position of said specific subject work based on said relative position of said specified distinctive geometric patterns belonging to said specific subject work.

* * * * *